US006463055B1

United States Patent
Lupien et al.

(10) Patent No.: US 6,463,055 B1
(45) Date of Patent: Oct. 8, 2002

(54) INTEGRATED RADIO TELECOMMUNICATIONS NETWORK AND METHOD OF INTERWORKING AN ANSI-41 NETWORK AND THE GENERAL PACKET RADIO SERVICE (GPRS)

(75) Inventors: Francis Lupien, Montreal; Paul Lee, St-Lazare, both of (CA); John Diachina, Garner, NC (US); Gunnar Rydnell, Rävlanda; Gunnar Thrysin, Stockholm, both of (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/306,489

(22) Filed: May 6, 1999

Related U.S. Application Data

(60) Provisional application No. 60/090,810, filed on Jun. 26, 1998, and provisional application No. 60/087,516, filed on Jun. 1, 1998.

(51) Int. Cl.[7] .............................................. H01L 12/66
(52) U.S. Cl. ...................................... 370/353; 370/356
(58) Field of Search ................................ 370/314, 338, 370/331, 349, 352, 353; 455/445, 435, 414, 426; 342/357; 307/354

(56) References Cited

U.S. PATENT DOCUMENTS

| | | | | |
|---|---|---|---|---|
| 4,592,048 A | * | 5/1986 | Beckner et al. ............. | 370/469 |
| 5,590,133 A | | 12/1996 | Billstrom et al. ........... | 370/349 |
| 5,729,536 A | | 3/1998 | Doshi et al. ................ | 370/328 |
| 5,845,203 A | * | 12/1998 | LaDue ........................ | 455/414 |
| 5,850,391 A | * | 12/1998 | Essigmann .................. | 370/331 |
| 5,936,948 A | * | 8/1999 | Sicher ........................ | 370/314 |
| 6,104,929 A | * | 8/2000 | Josse et al. ................. | 455/445 |
| 6,188,351 B1 | * | 2/2001 | Bloebaum ................... | 342/357 |
| 6,347,091 B1 | * | 2/2001 | Wallentin et al. ........... | 370/437 |
| 6,204,808 B1 | * | 3/2001 | Bloebaum et al. .......... | 342/357 |
| 6,208,633 B1 | * | 3/2001 | Joupila et al. .............. | 370/338 |
| 6,223,039 B1 | * | 4/2001 | Holm et al. ................. | 455/435 |
| 6,243,579 B1 | * | 6/2001 | Kari ........................... | 455/426 |
| 6,272,450 B1 | * | 8/2001 | Hill et al. ..................... | 703/13 |
| 6,353,605 B1 | * | 3/2002 | Rautanen et al. ........... | 370/337 |
| 6,359,904 B1 | * | 3/2002 | Hamalainen et al. ....... | 370/469 |
| 2001/0036173 A1 | * | 11/2001 | Shmulevich et al. ....... | 370/352 |

FOREIGN PATENT DOCUMENTS

| | | |
|---|---|---|
| EP | 0 821 507 A2 | 1/1998 |
| WO | WO 97/15157 | 4/1997 |
| WO | WO 97/21313 | 6/1997 |
| WO | WO 97/22216 | 6/1997 |
| WO | WO 97/48251 | 12/1997 |

* cited by examiner

*Primary Examiner*—Hassan Kizou
*Assistant Examiner*—Lu Yin
(74) *Attorney, Agent, or Firm*—Smith, Danamraj & Youst, P.C.; Sandra Beauchesne

(57) ABSTRACT

An integrated radio telecommunications network which integrates an ANSI-41 circuit switched network and a General Packet Radio Service (GPRS) packet data network to support a mobile station which operates in both the ANSI-41 network and the GPRS network. An interworking function interfaces a mobile switching center (MSC) in the ANSI-41 network with a serving GPRS switching node (SGSN) in the GPRS network by mapping circuit switched signaling utilized by the MSC into GPRS packet switched signaling utilized by the SGSN, and mapping GPRS packet switched signaling into circuit switched signaling. An interworking GPRS base station controller interfaces the SGSN with a GPRS/ANSI-136 base station which supports both ANSI-136 operations and GPRS operations. The interworking GPRS base station controller adapts the traffic signaling format utilized by the SGSN into an air interface traffic signaling format utilized by the GPRS/ANSI-136 base station. An authentication center interface passes the authentication state of the mobile station between an ANSI-41 home location register/authentication center (HLR/AC) in the ANSI-41 network, and a GPRS home location register/authentication center (HLR/AUC) in the GPRS network.

14 Claims, 12 Drawing Sheets

INTEGRATED RADIO TELECOMMUNICATIONS NETWORK AND METHOD OF INTERWORKING AN ANSI-41 NETWORK AND THE GENERAL PACKET RADIO SERVICE (GPRS)

RELATED APPLICATIONS AND PRIORITY STATEMENT

This non-provisional application, which discloses subject matter related to the subject matter of prior filed, co-pending U.S. patent application Ser. No. 09/217,385, filed Dec. 21, 1998, claims priority based upon the following prior filed co-pending U.S. provisional patent applications: (i) "Radio Telecommunications Network Integrating the General Packet Radio Service (GPRS) and the Digital Advanced Mobile Phone System (D-AMPS)", Serial No. 60/090,810, filed Jun. 26, 1998 in the names of Francis Lupi en, Paul Lee, John Diachina, Gunnar Rydnell, and Gunnar Thrysin; and (ii) "Merged Radio Telecommunications Network Interworking ANSI-41 and the General Packet Radio Service (GPRS)", Serial No. 60/087,516, filed Jun. 1, 1998 in the names of Francis Lupien and Paul Lee.

BACKGROUND OF THE INVENTION

1. Technical Field of the Invention

This invention relates to telecommunication systems and, more particularly, to an integrated radio telecommunications network which interworks circuit switched services and packet switched services, and to a method of interworking an ANSI-41 radio telecommunications network and the General Packet Radio Service (GPRS) packet data network.

2. Description of Related Art

Two approaches to data switching are circuit switching and packet switching. Plain old telephone service (POTS) and cellular voice services, for example, use circuit switching. Fixed circuit switching paths are set up between the parties involved in a call by exchanging signaling messages which contain the parties' addresses and request the establishment of a physical switching path. The signaling messages are exchanged between the addressees and switching centers, and between switching centers. The switch(es) respond to the requests in the signaling messages by establishing the physical switching path between the addressees. A data switch can be set up in a similar manner to provide circuit switched data services.

Packet switching, on the other hand, utilizes data packets which are comparatively short blocks of message data. The packets may be of fixed length as in asynchronous transfer mode (ATM), or may be of variable length as in frame relay or the Internet protocol (IP). Complete data messages are broken down into short packages, each with a header. These packets may be sent on diverse routes to their eventual destination. Because packets often travel on diverse routes, they may not arrive at the far-end receiving node in sequential order. Thus, the far end node must have the capability to store incoming packets and rearrange them in sequential order. The destination node reformats the message as it was sent by the originator and forwards it to the final destination user. Packet switching can be considerably more efficient when compared to circuit switching due to the multiplexing effects which make better use of the available transport bandwidth. Each service or user utilizes only the bandwidth it needs, leaving the unused bandwidth for other services/users. A plurality of paths must exist from the originating node to the destination node for in-service performance since an alternate route may be utilized in the event of failure or congestion of a given route.

GPRS is a packet data transmission service which is designed to function with the Global System for Mobile Communications (GSM) to enable mobile stations (MSs) to access both voice/circuit switched and packet data network services. A proposed GPRS packet data standard defines MS service classes and infrastructures to enable MSs to utilize the GPRS network. However, the GPRS standard addresses interworking requirements for GSM, but does not address interworking requirements for radio telecommunications networks based on ANSI/TIA standards such as those utilized throughout most of North America. The network architecture and the interface between the packet-data-specific nodes and the circuit-switched-specific nodes is tailored to GSM. GPRS does not fit within the ANSI-41 network. A system and method of interworking GPRS and ANSI-41 networks is needed so that the full GPRS functionality (e.g., services, interface protocols, node functionality, etc.) can be supported from the perspective of radio access logic, network logic, and service logic in ANSI-41 networks.

Today, ANSI-41 and ANSI-136 networks only provide voice or circuit-switched services. Therefore, an operator cannot benefit from the advantages and flexibility that packet switching provides when the operator is providing Internet access to subscribers utilizing ANSI-41/136-based cellular networks. A dial-up direct access connection or an analog modem connection must be made to the Internet. For a dial-up direct access connection, for example, a circuit-switched connection is provided between a MS and an Internet access gateway. A call is set up to the gateway, and then a Transmission Control Protocol/Internet Protocol (TCP/IP) session to an Internet provider is set up on top of that connection. This solution does not provide the benefits of multiplexing over the air interface and through circuit switching facilities since dedicated resources are utilized for the duration of the Internet connection. This is very inefficient since, in a typical Internet connection, packets of data are not continuously being sent over the connection. Thus, a voice channel over the air interface is tied up for the duration of the Internet connection, and associated circuit-switched resources over the network are not optimally utilized.

The existing solution is also not very flexible in terms of packet data network access because only one connection can be made at a time. It is not possible to make multi-party call connections for data calls in the way that multi-party voice connections can be made. Thus, simultaneous circuit switched voice and data services cannot be provided while connected through a circuit-switched connection to the Internet. If a voice call is routed to a mobile station during an Internet session, the subscriber cannot take the call and then résumé the Internet connection in a seamless fashion. The voice call must be rejected, routed to voice mail, or routed to another number. Additionally, the user cannot originate voice calls during a data call because the data call is circuit-switched between the mobile station and the Internet access gateway.

In order to overcome the disadvantage of existing solutions, it would be advantageous to have a method of integrating GPRS packet switched services and infrastructure with the ANSI-41 circuit switched services and infrastructure, thus enabling similar services to those available in GSM. The present invention provides such a method and integrated network.

SUMMARY OF THE INVENTION

In one aspect, the present invention is an integrated radio telecommunications network which integrates an ANSI-41 circuit switched network and a General Packet Radio Service (GPRS) packet data network. The integrated radio telecommunications network includes a mobile switching center (MSC) in the ANSI-41 network that provides circuit switched services to a mobile station which operates in both the ANSI-41 network and the GPRS network, and a serving GPRS switching node (SGSN) in the GPRS network that provides packet switched services to the mobile station. An interworking function interfaces the MSC with the SGSN, and maps circuit switched signaling utilized by the MSC into GPRS packet switched signaling utilized by the SGSN, and maps GPRS packet switched signaling into circuit switched signaling. An interworking GPRS base station controller interfaces the SGSN with a GPRS/ANSI-136 base station which supports both ANSI-136 operations and GPRS operations. The interworking GPRS base station controller adapts a signaling format utilized by the SGSN into an air interface signaling format and passes traffic signaling between the SGSN and the GPRS/ANSI-136 base station. The network also includes means for transparently transferring ANSI-136 information between the mobile station and the ANSI-41 network by adding the ANSI-136 information to selected GPRS messages.

The ANSI-136 information which is added to the selected GPRS messages may include registration and authentication information such as a Mobile Identification Number (MIN), an Electronic Serial Number (ESN), and an ANSI-41 Authentication Response (AUTHR). The selected GPRS messages to which the ANSI-136 information is added include an Attach Request message which is sent from the mobile station to the SGSN during a GPRS Attach procedure, and a Location Updating Request which is sent from the SGSN to the interworking function that interfaces the MSC with the SGSN.

In another aspect, the present invention is an integrated radio telecommunications network which integrates an ANSI-41 circuit switched network and a GPRS packet data network which includes a Class D mobile station which operates only over 30-kHz channels in both the ANSI-41 network and the GPRS network. An MSC in the ANSI-41 network provides circuit switched services to the mobile station, and a serving GPRS switching node (SGSN) in the GPRS network provides packet switched services to the mobile station. An interworking function interfaces the MSC with the SGSN, and maps circuit switched signaling utilized by the MSC into GPRS packet switched signaling utilized by the SGSN, and maps GPRS packet switched signaling into circuit switched signaling. An interworking GPRS base station controller interfaces the SGSN with a GPRS/ANSI-136 base station which supports both ANSI-136 operations and GPRS operations. The interworking GPRS base station controller adapts a signaling format utilized by the SGSN into an air interface signaling format, and passes traffic signaling between the SGSN and the GPRS/ANSI-136 base station.

The Class D mobile station is equipped with an International Mobile Station Identification (IMSI) which is utilized in the GPRS network. The interworking function includes means for translating the Class D mobile station's Mobile Identification Number (MIN) utilized in the ANSI-41 network into an associated IMSI utilized in the GPRS network. The integrated radio telecommunications network may also include a GPRS Home Location Register (GPRS HLR) in the GPRS network which authenticates the Class D mobile station for packet data purposes, and an ANSI-41 home location register/authentication center (HLR/AC) in the ANSI-41 network which authenticates the Class D mobile station for circuit switched purposes. The integrated network may also include a Class E mobile station which operates only over 30-kHz channels in the GPRS network. The Class E mobile station camps on a packet control channel (PCCH) as its normal mode of operation and only changes to a digital control channel (DCCH) at power-up to verify packet data service availability. The Class E mobile station is equipped with an IMSI, and the GPRS HLR includes means for authenticating the Class E mobile station.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
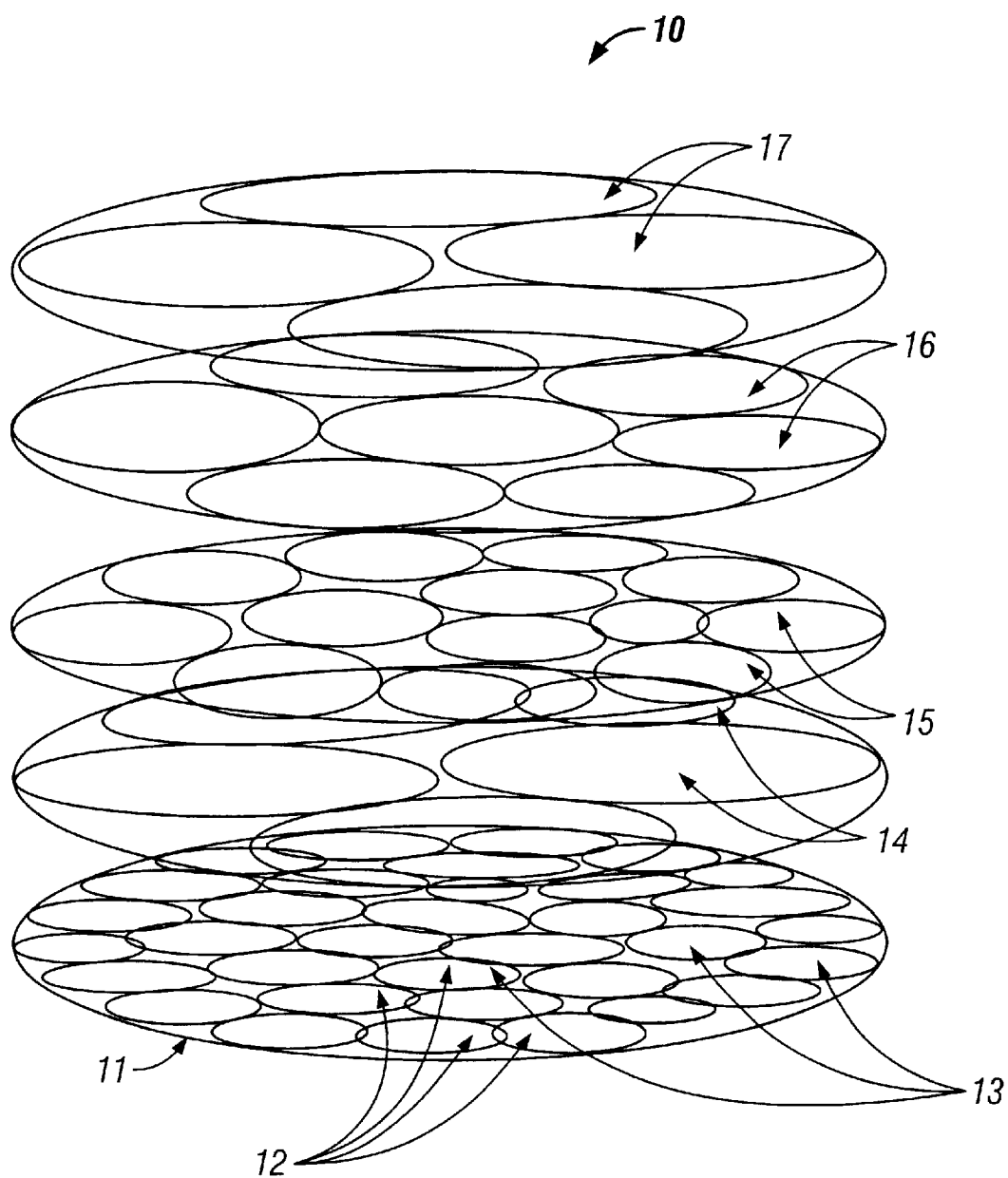
FIG. 1 is an illustrative drawing of an integrated radio network structure showing the relationship between various GPRS network areas and ANSI-41 network areas.

As noted above, GPRS is a packet data transmission service which is designed to function with the GSM system to enable mobile stations to access both voice/circuit switched and packet data network services.

The present invention defines the interface requirements to utilize GPRS with ANSI-41/ANSI-136 networks. The interface does not involve a straight reuse of the GSM interface because the GPRS service reuses part of the GSM network functions. Thus, the interface is different and more complicated with ANSI-41 networks. In particular, there are significant differences between the signaling involved in authentication and location updates.

When defining an interface between GPRS and ANSI-41 networks, alternative approaches are possible since the GPRS service reuses part of the GSM network functions. In a first approach, some of the GSM network functions are migrated to the ANSI-41 network. For example, for authentication services, the functionality of the GSM authentication center may be implemented in the ANSI-41 network. In this way, GPRS nodes and network functionality are, to a high degree, left intact, but the ANSI-41 nodes and network functionality are greatly impacted. Alternatively, the GPRS infrastructure may be modified to remove the GSM logic from the GPRS nodes and network functionality, and to implement ANSI-41 logic into them. For example, the GPRS functionality may be modified so that it does not reuse the GSM authentication center to provide authentication services, but instead, uses the ANSI-41 authentication center to provide services to the GPRS network.

The preferred embodiment keeps the amount of integration as low as possible by maintaining the integrity of each network function and node on both the GPRS side of the interface and the ANSI-41 side. The problem with attempting more extensive integration is that the two systems originate from two different standards, and have different evolutionary paths. Therefore, it is advantageous to limit the amount of GSM functionality that is integrated into the ANSI-41 infrastructure since future GSM/GPRS developments could cause major integration problems in ANSI-41 networks. Additionally, decoupling the networks to the greatest degree is the most efficient way to provide independent paths for system evolution. This allows for future growth of both networks.

The radio air interface in the ANSI-41/GPRS integrated system is based on ANSI-136, which is obviously different from the GSM/GPRS air interface. The present invention reuses the interfaces between the critical nodes in the GPRS architecture and the ANSI-41 nodes. This is also done to provide integration of packet data and voice services in an efficient way.

I. ANSI-41/136 Description

A. Radio Resource Handling

It is useful to define some terms utilized in the following description of the radio network configuration (corresponding to the RR sub-layer). A MSC service area is a grouping of cells with associated carriers and channel functions controlled by a MSC. A voice/circuit switched service area is a subset of a MSC service area.

An ANSI-136 MSC service area or exchange area is built with a number of cells, each cell supporting a number of channel functions. Characteristics of the voice/circuit switched service area within the ANSI-136 MSC service area are as follows:

1. The MSC service area can be divided into a number of location areas (LAs). Each location area is built from a number of cells, and is associated with a voice/circuit switched service area;
2. Both the MSC service area and the location areas are seen by mobile stations as registration areas, and are utilized in the location tracking mechanism;
3. The MSC service area may also be divided into a number of paging areas (PA), built from a number of location areas. Typically an LA has an associated PA. A PA is associated with voice/circuit switched service areas.
4. Both LAs and PAs can be utilized for paging mobile stations;
5. The MSC has a neighbor MSC, and the neighbor MSC's service area may be expressed by defining a satellite paging area (SPA). A SPA is associated with a voice/circuit switched service area. A SPA in a neighbor MSC is tied to a PA in the MSC.

B. Mobility Management (MM)

1. Location Tracking in MSC Service Area

From the cellular network point of view, mobility management has a set of rules based on a hierarchical node model. The rules are designed to limit network interaction in order to minimize ambiguity in the true location of mobile stations. A central HLR supervises mobile station mobility between VLRs, and a central VLR supervises mobile station mobility between one or more serving MSC/VLRs. Therefore all execution rules for cellular services and other functions (e.g., authentication) are based on the established MM network concept.

The location of a mobile station within a serving system service area is kept track of by forcing the mobile station to report its location. The mobile station reports its location through a "geographic" registration mechanism when crossing predefined geographical areas. Typically, such geographical areas are built from LAs and are identified to mobile stations through broadcast LOCAREA and System Identification (SID) parameters. In the present invention, the LA is kept track of in the VLR at mobile station registration accesses, independently of registration type (i.e., independent of the event that triggered the registration access). This process ensures that the most up-to-date LA is utilized for paging. Typically this LA is used in the first page attempt to a mobile station. The LA may also point to a PA. The PA and whole service area can potentially be used in paging the mobile station on subsequent attempts when no response to a first (or second) page attempt is received. Activity of a mobile station is kept track of by forcing the mobile station to register at power-up, power-down, and at a constant interval while active through a periodic registration mechanism.

2. Location Tracking Across MSC Service Areas

Location of a mobile station across service areas (VLR id, MSC id, etc.) is kept track of by forcing the mobile station to register. The SID typically identifies the system operator, and therefore marks a system area boundary. MSC boundaries within the same SID area are identified as different LAs since is it essential that mobile stations report their location when crossing service area borders. A first registration access in a service area causes the following:

a. The serving system's MSC and the VLR-functions determine that the mobile station is not active and not authenticated. An authentication transaction towards the AC is then launched. From the IS-41 network perspective, there is a difference between subscriber validation and subscriber authentication.
b. Upon successful mobile station authentication, the mobile station location (LA, MSC id, VLR id) is updated in the serving system's database and the home system's database through transaction procedures towards the VLR and HLR.
c. If the mobile station was active in another service area prior to the first access, the old serving system area VLR and MSC may be polled by the AC to fetch the authentication call history "count". The HLR then requests the old serving system to remove the mobile station from the active list by launching a registration cancellation transaction.

C. ANSI-41 Network Authentication and Security Procedures

The security process in ANSI-41 networks is based on iterations of a single algorithm (CAVE) to generate and update the Shared Secret Data (SSD) (authentication and ciphering keys), for access authentication. The security process also involves validation of network parameters such as "count". The SSD-generation process involves three iterations: SSD, AUTHU (for unique challenge), and AUTHBS (for BS challenge). Subsequently, each mobile station access requires one iteration for the generation of the ANSI-41 Authentication Response (AUTHR). The SSD generation is triggered by the AC, and is based on A-key and random number generation. One random number is common between the AC and the mobile station (RANSSD) and is generated by the AC at SSD generation time. The random number used for unique challenge (RANDU) may be generated at the AC or at the MSC/VLR when the SSD is shared. In the latter case, AUTHU and AUTHBS computations are also local to the MSC/VLR. The generation of AUTHR is based on SSD, RAND, and dialed digits etc. RAND is assumed to be generated locally at the MSC level, and broadcast on the overhead message train (OMT) or Broadcast Control Channel (BCCH). When SSD is not shared, authentication occurs at the AC and both the mobile station's AUTHR and RAND are sent to the AC. When SSD is shared, the AUTHR computation and validation are performed at the MSC/VLR.

II. GPRS Description

In the description that follows, the term "simultaneous" expresses the requirement to simultaneously support GPRS packet switched services, circuit switched services, and Short Message Service (SMS) services. The range of MS services considered "standard" GPRS functions is as follows:

Simultaneous initial registration (International Mobile Station Identification (IMSI) attach and GPRS attach), simultaneous activation (packet data services and circuit switched services);

Simultaneous monitoring (circuit switched and packet switched services on only one control channel);

Simultaneous invocation of circuit switched calls and packet channel transactions. Some subscribers may have limited simultaneous invocation (on-hold type of approach is used for one of the invocations);

Simultaneous traffic (on same or different frequencies). Some subscribers do not have this capability (i.e., no simultaneous traffic); and Some subscribers may only use circuit switched and packet switched services alternatively, when both services are supported.

The GPRS standard specifies the GPRS core functions as being independent functional entities from the existing GSM circuit switched services core functions, while allowing for the GSM and GPRS functions to interwork for support of circuit switched services during packet data transactions. The intent of the specification is to introduce GPRS functions that are not built upon or invoking GSM core circuit switched services functions in order to deliver packet switched services.

Mobile station service class requirements must be supported through the integration of GPRS in the ANSI-41 reference network. The integration must involve the radio access logic, network logic, and service logic. This mandates impacts on infrastructure, node functionality, and interface protocols for (1) radio access and resource handling, (2) data path connection with GPRS-upgraded ANSI-136 radio access functions, and (3) service control and mobility handling with ANSI-41 nodes and node functionality through signaling protocol interfaces. From the perspective of the radio frequency physical link, and the radio resource management sub-layer, ANSI-136-specific radio frequency and radio resource management functionality may be integrated in the GPRS architecture. From a network and service logic perspective, the impact on the ANSI-41 architecture in term of functions, messages/interfaces, and transport media varies depending on the degree of integration that is attempted.

The GPRS logical functional architecture is based on the same functional layering principles as found in the GSM functional architecture. The most important functional plane defines the layer 3 functions, or as they are referred to in the GPRS standard, the layer 3 sub-layers and their associated entities. There are four sub-layers in the GPRS protocol architecture: Radio Resource (RR) Management, Logical Link Control (LLC), Mobility Management (MM), and Connection Management (CM). Layer 3 sub-layers are functionally orthogonal for GPRS services and for non-GPRS services. The important sub-layer entities are briefly described below. Typically, each sub-layer entity is defined by only one protocol between the peer protocol entities in the mobile station and in the network.

A. RR Sub-Layer

The RR sub-layer is composed of the following functional blocks:

1. RR dedicated mode entity for non-GPRS services; and
2. GPRS RR Shared mode (Radio Link Control/Medium Access Control (RLC/MAC)) for GPRS services.

A packet data service area is a grouping of cells where the associated packet data functions are controlled by a SGSN. Typically, this is a subset of a MSC service area. A Serving GPRS Switching Node (SGSN) service area is a packet data service area, and may consist of an overlay of one or more entire MSC service areas. The SGSN service area may also be an overlay of a subset of a MSC service area. Cells in the SGSN service area have support for GPRS packet data channel (PCCH) channel function(s). Characteristics of the SGSN packet data service area within the ANSI-136 MSC service area are as follows:

A SGSN service area is built from a number of routing areas (RA). A RA is a packet data service area, and is identified by a RA code (RAC);

RAs that are built from a number of cells having support for GPRS PCCH channel functions;

A GPRS RAC is tied to a voice/circuit switched services location area (LAI=LA Id.) in a unique relationship: RAI=RAC+LAI, (RAI=RA Id). LAI represents the overlay of the Voice/circuit switched service area and the packet data service area; and RAs are sized to fit an area smaller or equal to a GSM LA in order to better control the paging load due to incoming GPRS traffic.

B. LLC Sub-Layer

The LLC sub-layer includes a number of functional blocks which handle Quality of Service (QoS) and signaling traffic. The LLC sub-layer is responsible for transporting higher layer information between the Serving GPRS Switching Node (SGSN) and the mobile station.

C. MM Sub-Layer

The MM sub-layer includes the following blocks:

Non-GPRS services mobility (MM entity);

GPRS mobility (GMM entity); and

GMM anonymous access (GMM-AA entity).

GMM and GMM-AA are implemented with peers in the SGSN, and mobile station only. MM is implemented with peers in the MSC/VLR and mobile station.

GMM common procedures include Temporary Link Layer Identifier (TLLI) Assignment, Packet Temporary Mobile Station Identification (P-TMSI) Allocation, GPRS Authentication and ciphering, GPRS Identification, and GPRS Information, and are initiated by the network once a PDP context is established.

GMM-specific procedures include:

A procedure initiated by the network or mobile station and used to detach the IMSI in the network for GPRS services and/or non-GPRS services and to release a GMM context: GPRS detach.

A procedure initiated by the mobile station and used to attach or detach the IMSI in the network for GPRS services and/or for non GPRS services and to establish or release the GMM context: GPRS Attach, Combined Attach, GPRS detach and combined GPRS detach.

A procedure initiated by the mobile station once a GMM context has been established, and used to maintain the mobility context (states, location, etc.) synchronously in the mobile station and the network: RA Updates, combined RA updates and Periodic RA updates.

1. Location Tracking within and Across GPRS Service Areas

Depending on the mobile station class, a mobile station may attach either to IMSI for circuit switched services, GPRS for packet switched services, or both types of services as a combined IMSI/GPRS attach. The attach procedure can be compared to a power-up registration. The detach procedure can be compared to either a power-down or a deregistration procedure. While roaming in packet data service areas, GPRS subscribers with Class A or B mobile stations can be attached to the GPRS network and/or the circuit switched network. Subscribers with Class C mobile stations can be attached to the GPRS network only. From the GPRS network perspective, tracking is done whether the mobile station has a terminal operating in Class A/B or Class C. For Class A/B, location updates may be combined RA/LA update procedures or independent RA and LA update procedures, while for Class C, RA location updates are performed. Combined RA/LA updates enable simultaneous updating of the mobile station location for both the voice/circuit switched service area and the packet data service area. The present invention introduces new Class D and Class E mobile stations which are described below in connection with the CM Sub-Layer.

2. Routing Area and Location Area Tracking

Routing Area Identification (RAI) and Location Area Identification (LAI) parameters are broadcast on the GPRS control channel. This allows the mobile station to track MSC/VLR LAs and RAs while in GPRS standby or ready mode. Therefore two independent network processes are involved:

The mobile station detects a new Routing Area (RA) within the current overlaid location area (i.e., a new RAC with LAI unchanged). This triggers a RA update.

The mobile station detects a new Location Area (LA) (i.e., the LAI is different). This triggers a combined RA/LA update since the associated MSC service area may be different, and a new association between the SGSN and the MSC/VLR must be performed.

3. Circuit Switched Service Connection Support in the GPRS Nodes

In order to support circuit switched services in the GPRS network, the following functions are implemented in the SGSN, and some adaptation of the call control and mobility management functions in the GSM MSC/VLR is performed.

IMSI attach/detach to the MSC/VLR, and GPRS attach/detach indication;

LA updates to the MSC/VLR (including periodic updates);

Paging order to the serving SGSN for circuit switched connection; and

Alert procedures for non-GPRS services.

4. Network Security Functions

Based on existing procedures/algorithms, the GPRS nodes must use identity confidentiality (for example, based on the Temporary Link Layer Identifier (TLLI)), authentication procedures to validate mobile stations, and ciphering keys to encrypt LLC PDUs. A triplet vector must be available to the SGSN along with the ciphering algorithm and the ciphering key sequence number. Subscriber identity confidentiality may be maintained utilizing the Temporary Mobile Station Identifier (TMSI). The TMSI addressing function requires network assignment of a temporary identity to roaming mobile stations. In the scope of GPRS, the MSC/VLR may return a TMSI to the SGSN upon successful LA updating (for MS addressing using TMSI on the SGSN-MS interface). Therefore, as long as the TMSI addressing in the SGSN is optional, a TMSI does not have to be assigned. Otherwise the SGSN must be updated to remove the TMSI optionality.

As noted above, subscriber identity confidentiality may also be maintained utilizing the Temporary Link Layer Identifier (TLLI). TLLI addressing on the LLC protocol requires network assignment of a temporary identity, and is local to the GPRS nodes. TLLIs are assigned at RA updates. In GPRS, subscriber identity confidentiality and TMSI transfer to mobile stations is performed in cipher mode in the location update acknowledgment to the mobile station.

GSM subscriber identity authentication and ciphering requirements include the following:

MS id Key (Ki) and Key generation algorithms (A3, A8) in the AUC and mobile station;

Generation of Security Related Information such as cyphering key (Kc), security result (SRES), and random number (RAND) vectors. The vectors are distributed to the SGSN (and the GSM MSC/VLR). Only RAND is transferred to the mobile station for its internal generation of Kc and SRES upon authentication request from the network; and Typically in GSM, the DCCH and TCH are encrypted with the ciphering key Kc applied with ciphering/deciphering algorithm A5 at the BSS level.

Thus, the sequence of events in the GSM/GPRS network related to security functions is as follows:

a. Upon first access, or at IMSI/GPRS attach, the triplet vector (RAND, SRES, Kc) is generated by the AUC. SRES and Kc are generated using RAND and Ki (equivalent A key). The triplet vector is transferred from the AUC to the MSC/VLR or SGSN. Notice that one iteration is performed of two algorithms in parallel, and no algorithm computation is required in the SGSN or MSC/VLR.

b. The MSC/VLR or SGSN has control over which RAND in the vector is to be used for a given authentication cycle. The RAND is sent to the mobile station (on the air) when authentication is requested by the MSC/VLR or SGSN through an explicit "authentication request" message to the mobile station. An authentication request message follows every location update message from the mobile station (at location or system area registration).

c. The mobile station uses RAND and IMSI to generate SRES, which is forwarded to the BSS/MSC/VLR or SGSN in an "authentication response" message.

d. The mobile station internally generates the Kc using the RAND and Ki. A new Kc is used for ciphering thereafter upon order from the MSC/VLR or SGSN. This happens at every location update.

e. When a mobile station performs a "location update" access in a new MSC/VLR area, the new VLR fetches the vectors from the old VLR.

f. Once all keys have been used in the vector, the MSC/VLR or SGSN requests a new set from the HLR/AUC. Also note that in the GSM architecture, layer 3 messages (control plane) are end-to-end (i.e., mobile station-to-MSC/VLR). The BSS acts as a transport only, except for air interface ciphering where it is directly involved in applying the A5 algorithm. There is no broadcast of RAND etc.

5. Authentication Synchronization Between SGSN and MSC/VLR

While the mobile station is controlled by the GPRS network nodes, the MSC/VLR does not authenticate the mobile station via the SGSN upon attach or location updates. The SGSN and MSC/VLR may independently handle security processing. The MSC/VLR may vary its authentication procedure in relation to circuit switched connection services. The mobile station may use IMSI for call related accesses if no prior TMSI was assigned. Note that call accesses received on the GPRS control channel PCCH are forwarded to the MSC/VLR (not the SGSN). A new RAND is then used to authenticate (generate SRES) and to cipher (generate Kc). There is no need to coordinate the RAND selection between the MSC/VLR and SGSN. The SGSN and MSC/VLR may use the triplet independently.

D. CM Sub-Layer

The CM sub-layer includes functional blocks for GPRS services and functional blocks supporting GPRS short message service control (GSMS). The functional blocks for GPRS services are implemented in the SGSN and mobile station only, and include Session Management (SM) functions. The main role of the SM functions is to support mobile station PDP context handling. The SM functions include procedures for identified PDP context activation, deactivation, and modification as well as anonymous PDP context activation and deactivation. SM procedures for identified access can only be performed if a GMM context has been established between the mobile station and the network. If no GMM context has been established, the MM sub-layer must initiate the establishment of a GMM context by use of the GMM procedures. After GMM context establishment, the SM functions use services which are offered by GMM (see GSM 04.07). Ongoing SM procedures are suspended during GMM procedure execution. For non-GPRS services, the CM sub-layer includes functions such as Call Control (CC) entity, Support for SMS entity, Supplementary Services (SS) entity, Group Call Control entity, and Broadcast Call Control. These functions are implemented in GSM core network nodes only.

For interoperability purposes, a small set of GPRS layer 3 functions were integrated horizontally with the GSM core functions. (Note: The core network functions refers to all GPRS functions with the exception of those in the BSS, mobile terminal (MT), and terminal equipment (TE)). Following the typical functional layering approach, the set of GPRS layer 3 functions includes the following functions.

1. At the MM Sub-Layer

GSM core network concepts were reused as GPRS specific instances and introduced in the GPRS core network model. These are:

The GPRS-specific home location register (GPRS HLR) for profile and location update handling in the GPRS core network; and The reuse of authentication algorithms from the GSM authentication center (AUC) for generation of a triplet vector. The above functions are supported through a GPRS-specific interface (Gr), modeled on the "D" interface between the GPRS HLR and the SGSN.

MS mobility between GSM and GPRS core networks. To support concurrent or simultaneous access to GSM and GPRS services, mobility functions between the GSM and GPRS networks are integrated at the VLR level. The SGSN is seen as an access node from the GSM serving node perspective. The functional relationship between the GSM MSC/VLR and the SGSN is comparable to that of a subset of an "A interface" (i.e., the Gs interface), and is of much lesser scope than that of the A interface.

MS mobility between the radio access network and the GPRS core network. For mobility management purposes, the relationship between the BSS and the SGSN is similar to that of the BSS and the MSC/VLR. The "mobility context" is maintained through MM signaling between the GPRS core network and the BSS, and involves the uplink transfer of location information (cell identity and radio status) and paging orders on the downlink. MM signaling is conveyed through the Gb interface instead of the A interface. The Gb interface also multiplexes virtual circuits for MS user data and MS user signaling for GPRS mobility management and SMS messaging.

2. At the RR Sub-Layer

The GPRS core network assumes that packet radio bearer services (GPRS-specific RR layer functions) are available from a BSS radio access node. The management and traffic handling of both circuit switched dedicated mode and packet switched shared mode radio bearers is integrated at the BSS. The shared mode RR is integrated with the dedicated mode RR at the BSC. This includes both management and traffic handling components. At the base station transceiver (BTS) level, the GPRS radio channel structure is added to the existing GSM circuit switched channel definition.

Noting that the HLR and BSS may be GPRS-specific, the GPRS infrastructure may be deployed separately from the GSM circuit switched infrastructure.

III. GPRS/ANSI-41 Integration

The problem, then, in defining an interface between the GPRS service and the ANSI-41/136 network is to reconcile the GPRS RR, MM, SM, and SMS sub-layer entities with their ANSI-41/136 counterparts and integrate the two systems. There are alternative approaches to this integration process. First, the integration may be performed through a selective horizontal integration of MM and security. This approach preserves the functional integrity of both the GPRS/GSM core network and the ANSI-41 core network and allows them to coexist by maintaining the orthogonality of the distinct GPRS/GSM and ANSI-41 circuit switched networks with interworking at the VLR level for mobility management purposes. A second approach is full vertical integration of MM and security. This may be performed in one of two ways, either by adapting the GPRS nodes to operate with the ANSI-41 authentication and mobility management procedures, or by implementing the GSM requirements for authentication and mobility management, etc., as part of the ANSI-41 core network (functions and messages). If the GPRS nodes are adapted to operate with ANSI-41 procedures, ANSI-41 authentication center algorithms and keys are re-used and implemented in the GPRS mobile terminal and nodes.

In the present invention, a selective horizontal integration is performed. The separation and independence between GPRS and GSM core services functional sub-layer entities and logical nodes provides the basis for defining the GPRS and ANSI-41/ANSI-136 integration. This independence enables the selective horizontal integration to be performed, thus preserving the integrity of each architecture. This approach is flexible since selected parts of sub-layers can be integrated. This approach is also simpler because the required changes are focused on only part of the architecture. The approach is also more efficient than the alternatives because it enables services from both architectures to be provisioned with a low complexity solution.

Therefore, as long as a number of straightforward requirements on network co-existence and interwork are satisfied, it is possible to leverage the existing ANSI-136/41 and GPRS standards to a maximum extent and minimizing standards development and coincidental infrastructure impact on respective systems. The GSM-GPRS architecture described earlier is adapted by replacing the GSM core functions with ANSI-41 and ANSI-136 based circuit switched services infrastructures.

More specifically, the GSM core network logical nodes (MSC/VLR, HLR, AUC, EIR, SM-SC) are replaced with ANSI-41 core network logical nodes (HLR/AC, MSC/VLR, MC/OTAF). Additionally, functions associated with the GSM dedicated mode RR (radio resources management) for circuit switched services are replaced by ANSI-136-based circuit switched radio access bearers and radio network concepts.

To achieve these co-existence and interworking requirements, the present invention defines a new ANSI-136 RR sub-layer which includes a new ANSI-136 medium access control (MAC) providing higher layer services to the GPRS LLC sub-layer.

The circuit switched core network functions consist of the ANSI-41/136 core network infrastructure with an ANSI-41 MSC/VLR, MC and HLR/SCP/AC.

The invention also enables ANSI-136 user signaling information to flow from the mobile station to the ANSI-136 infrastructure through the serving GPRS node. The ANSI-136 information may be transferred transparently between the mobile station and the ANSI-136 infrastructures based on piggybacking ANSI-136 information in GPRS messages. This is referred to as "tunneling" of ANSI-136 information. ANSI-41 authentication/registration information (MIN, ESN, Authentication Response (AUTHR), etc.) is tunneled through the GPRS infrastructure to the ANSI-41 infrastructure during a GPRS attach procedure. This procedure is illustrated in more detail in FIG. 6.

With the GPRS-based ANSI-136 network layer (LLC sub-layer and function layers) solution in place, one is free to move to "Enhanced Data rates for GSM Evolution" (EDGE) channels for packet data services at any point without having to change the network signaling (LLC sub-layer and above) yet again. The network layer signaling changes required for packet data services over 30 kHz channels are fully applicable and/or sufficient for EDGE channels. This approach therefore provides a very smooth migration path to EDGE channels as the LLC and higher layers can be re-used from ANSI-136 as they are independent of the RR sub-layers (RLC, MAC) and physical layers specific to both 30 kHz channels and EDGE channels.

A. At the CM Sub-Layer

At the CM sub-layer, the present invention introduces a new Class D mobile station type with capabilities to concurrently access both GPRS packet data service and ANSI-136 circuit switched services. The Class D mobile station is similar to the GPRS Class B mobile station, but is only capable of operating over 30 kHz channels and is attached to the ANSI-41 infrastructure instead of the GSM infrastructure for circuit-switched services. The Class D mobile station has the capability to gain access to both GPRS and ANSI-136 associated services while it is connected through the GPRS packet radio access network (camping on the PCCH). This mobile station type has associated call control, service interaction handling and teleservices handling performed within the ANSI-41 infrastructures. Transfer of service notification between the mobile station and the ANSI-41 MSC/VLR is subject to a mobility management clause at the MM sub-layer.

Class D mobile stations camp on the packet control channel as their normal mode of operation, and only go to a DCCH in three cases, (1) at power-up to verify packet data service availability and the presence of a Beacon PCCH, (2) at voice call establishment, and (3) at GPRS Detach.

The present invention also introduces a new Class E mobile station which is only capable of GPRS packet data service. The Class E mobile station is similar to the GPRS Class C mobile station, but is only capable of operating over 30 kHz channels. The Class E mobile station has the capability to acquire ANSI-136 associated services while connected through the circuit switched radio access network (camping on the DCCH) only. Class E mobile stations camp on the packet control channel as their normal mode of operation, and only go to a DCCH at power-up to verify packet data service availability and the presence of a Beacon PCCH. Both the Class D and Class E mobile stations have PDP context associated procedures, and are supported through existing Session Management (SM) functions.

Mobile station terminated voice calls originate within the ANSI-41 infrastructure and are completed by means of the ANSI-41 Unsolicited Response (UNSOLRES) message.

Class D and Class E mobile stations are equipped with an IMSI that is used only within the context of the GPRS infrastructure. The IMSI may be provided by a SIM card as currently described in the GPRS standards, and therefore does not require support via the ANSI-136 OTA procedures or entry in an ANSI-41 subscriber profile. The GPRS-VLR IWF 37 (see FIG. 5) translates ANSI-41 MINs into the associated IMSI established during the GPRS attach procedure. The SGSN 32 then translates between the IMSI and TLLI.

B. At the MM Sub-Layer

At the MM sub-layer, the mobile station's GPRS service profile resides in the GPRS HLR. The mobile station's circuit switched service profile resides in the ANSI-41 HLR. For circuit switched purposes, location updates and subscriber profile updates for the mobile station are performed by the ANSI-41 HLR. When the mobile station operates in GPRS mode, associated ANSI-136 information is forwarded towards/from the associated infrastructures. For packet data purposes, location updates and subscriber data updates for the mobile station are provided by the GPRS HLR. GPRS packet data related security functions for mobile stations are also provided by the GPRS HLR. The execution of associated security functions still resides within the scope of the GPRS core network.

Authentication of a Class D or Class E mobile station for packet data purposes is performed by a GPRS HLR/AUC. Authentication of a Class D mobile station for circuit-switched purposes is performed by an ANSI-41 HLR/AC. Since data encryption is provided at the LLC sub-layer according to the GPRS packet data security functions, there is no need to provide ANSI-136 message encryption and privacy functions over the PCCH.

An optional interface (F1) is established between the ANSI-41 HLR/AC and the GPRS HLR/AUC for authentication synchronization between packet switched and circuit switched services. The GPRS HLR/AUC informs the ANSI-41 HLR/AC of its state of authentication. If the subscriber is successfully authenticated in the GPRS system, the ANSI-41 HLR and MSC/VLR do not expect the mobile station's AUTHR at non-call accesses. When the subscriber is active and authenticated in the GPRS system, the ANSI-41 HLR and MSC/VLR only invoke security functions for call accesses (originating and terminating).

The relationship described above between the GSM MSC/VLR and the GPRS serving node, is preserved to support similar mobility functions between the mobile station and the SGSN and the ANSI-41 MSC/VLR. Some mobility functions are supported through the existing Gs functional procedure. Other mobility functions and miscellaneous ANSI-136 signaling are supported through new signaling messages between the MSC/VLR and the GPRS serving node. GPRS signaling procedures use an IMSI-based MSID addressing scheme. ANSI-136 based signaling procedures use a MIN-based MSID addressing scheme.

The SGSN must be able to detect when a location update is performed toward the ANSI-41 network. The use of broadcast location areas and routing areas on the PCCH defines a relationship between the GPRS MSC/VLR's serving area LAs and the GPRS serving area RAs. The mobile station must inform the SGSN of the need to perform a location update whenever a new LAI is detected on the PCCH, which also coincides with a newly detected RAI. The mobile station updates the SGSN on its position by sending a Routing Area Update Request and also indicating that an LA update shall be performed. RAIs are used to identify the association between the SGSN and the GPRS MSC/VLR through translation tables. The SGSN then forwards the LA update to the GPRS MSC/VLR. This RA and LA update may be referred to as a "Combined RA/LA update".

The same approach is utilized to keep the handling consistent with the pure GPRS system, with the following difference. The combined LA/RA update is implemented when the broadcast of location areas and routing areas on the PCCH defines a relationship between the ANSI-41 MSC/VLR which serves the LAs and the GPRS SGSN which serves the RAs. Thus, the use of broadcast location area and routing area on the PCCH defines a relationship between the LAs and the RAs such that a location area may represent a set of cells with DCCH coverage which may also coincide with, or share the cell coverage of one or more routing areas built from cells with PCCH coverage. In the present invention, the LA and RA relationship defines an association between the GPRS SGSN RAs and the ANSI-41 MSC/VLR.

In order to support the above, the mobile station updates the SGSN on its position by sending a Routing Area Update Request, also indicating that an LA update shall be performed. RAIs may be used to identify the association between the SGSN and the GPRS-VLR IWF/ANSI-41 G-MSCs through translation tables. The SGSN may then forward the LA update to the GPRS-VLRIWF. The administrator of the network coordinates the associations between RAI, ANSI-41 MSC/VLR LAs and GPRS-VLR IWF/ANSI-41 G-MSC IDS.

GPRS and ANSI-136 geographical location triggers are based on the concept that RAIs shall not span more than one SGSN service area, and shall be unique within and between SGSNs. Thus:

The scope of a LAI is defined such that it does not span more than one SGSN service area.

The scope of a LAI may be defined to span a subset of a SGSN service area.

The scope of a LAI is defined such that it does not span more than one ANSI-41 Gateway/Serving MSC/VLR service area.

The scope of a LAI may be defined to span a subset of an ANSI-41 Gateway/Serving MSC/VLR service area.

RACs are unique within the scope of a LAI, and thus within the scope of a RAI. Therefore, the scope of a RAC is defined such that it cannot exceed the scope of a LAI.

A mobile station performs both a Routing Area Update procedure and an ANSI-136 Registration when the mobile station perceives a change in RAI due to a LAI that is different from the one that applied prior to the current cell selection or reselection. More specifically:

The new cell belongs to a new SGSN service area and a new ANSI-41 Gateway/Serving MSC/VLR service area; or The new cell belongs to a new SGSN service area and the same ANSI-41 Gateway/Serving MSC/VLR service area; or The new cell belongs to the same SGSN service area and a new ANSI-41 Gateway/Serving MSC/VLR service area.

C. At the RR Sub-Layer

The ANSI-136 RR sub-layer has a shared mode and a dedicated mode specifying the overall radio network and access functions with management and traffic handling entities. These are implemented in the BS and ANSI-41 MSC/VLR. The ANSI-136 shared mode RR sub-layer is defined through a new ANSI-136-specific physical layer and MAC layer. The physical layer and RLC/MAC layer are specified to accommodate 30 kHz ANSI-136 channels. The GPRS radio resource function is also modified to accommodate 30 kHz ANSI-136 channels. The ANSI-136 shared mode RR sub-layer supports both the Acknowledge and Unacknowledge modes of operation.

The shared mode RR management entity (RRME) of the radio network and access functions includes a BS air interface-specific component and a BS network component. The BS network component is implemented in an Inter-working GPRS Base Station Controller (BSC) and in the ANSI-41 MSC/VLR. The ANSI-41 MSC/VLR component is merged with the existing dedicated mode RR management entity to (1) handle channel and timeslot configuration (spectrum management and channel management), (2) support GPRS and ANSI-136-specific channel management for DCCH and GPRS packet control channel selection and reselection, and (3) process other operation, administration, maintenance and parameters (OAM&P) packet broadcast control channel (PBCCH) information, including broadcast of authentication RAND, and other access and system parameters related to the RR sub-layer operation. A radio resource management interface (F3) may be provisioned between the Interworking GPRS BSC and the ANSI-41 MSC/VLR to coordinate the three management functionalities.

The ANSI-136 shared mode RR traffic handling entity of the radio network and access functions also has a BS air interface-specific component and a BS network-specific traffic handling component. The BS air interface-specific component handles the relay over the air interface MAC. The BS network-specific traffic handling component handles an equivalent Gb interface termination and provides a relay between the Gb interface and the BS. The network-specific component is implemented in the Interworking GPRS BSC which may be physically located at the BS or ANSI-41 MSC/VLR.

The PCCH and the PTCH are configurable using GPRS logical channel configuration tools which may be modified as necessary. The PCCH is used for control signaling and delivery of packet data payloads in the uplink and the downlink. This allows for initial deployments to consist of a single full-rate PCCH on any given ANSI-136 channel frequency. The PCCH uses the same superframe format (modulo 32) as ANSI-136 DCCH channels. PCCH superframes consist of X broadcast slots (PBCCH) and Y paging slots (PPCH) where X+Y=32. PCCH slots configured as PPCH slots may also be used to carry control information or packet data payload information (PARCH).

D. At the LLC Sub-Layers

Set forth below are possible combination of modes when the ANSI-136 shared mode RR (ANSI-136 RLC/MAC) and LLC are considered together:

LLC Unacknowledged—RLC Unacknowledged This mode seems likely whenever there is a network layer exchange of short messages (1–2 slots) where acknowledgment is built into the network layer signaling itself. An example is where the system sends a Page and the mobile station sends a page response (any LLC frame serves as a page response per GPRS). Other than the network layer handshake, the only acknowledgment that takes place is the conformation at the RLC layer of a successful contention based access during which the page response was sent. Upon receiving the Page Response the base station RLC confirms its reception by transmitting a control plane message indicating "Received" to the winning mobile station. The Page Response is important to the infrastructure as it allows it to consider the mobile station as having been successfully notified. The mobile station must therefore be sure that its Page Response was successfully transmitted. If the mobile station does not receive an RLC control plane confirmation within, for example, 120 ms, it re-sends its Page Response.

LLC Unacknowledged-RLC Acknowledged

This mode may be useful in any of the following cases:

(i) Longer network layers are to be sent, the associated network layer acknowledgments have too large a delay associated with them and acknowledged mode at the RLC layer alone is considered sufficiently reliable.

(ii) The LLC is unable to operate in acknowledged mode.

LLC Acknowledged—RLC Unacknowledged

This mode may be unlikely. Having only one of these layers operate in acknowledged mode would make the RLC seem preferable as its ARQ is based on smaller segments.

LLC Acknowledged—RLC Acknowledged

This mode may be useful whenever longer network layer messages are to be sent and very secure and/or reliable transmission is desired.

E. Description of Figures

FIG. 1 is an illustrative drawing of a MSC/VLR's radio network structure 10 showing the relationship between various GPRS network areas and ANSI-41 network areas in an integrated GPRS/ANSI-41 network. Illustrated at the lowest level is a circuit switched MSC service/exchange area 11. The MSC service/exchange area is shown to be divided into a plurality of voice/circuit switched service cells 12 defining a voice/circuit switched service area, and a plurality of packet data service cells 13 defining a packet data service area.

A Serving GPRS Service Node (SGSN) service area 14 spanning a packet data service area may overlay or share the cell coverage of a portion of one or more MSC service/exchange areas. As shown at the next level, the SGSN service area may be divided into a plurality of routing areas 15. Likewise, as shown in the next two levels, the MSC service/exchange area 11 spanning a voice/circuit switched service area may be divided into a plurality of location areas 16 and paging areas 17.

Figure 2:
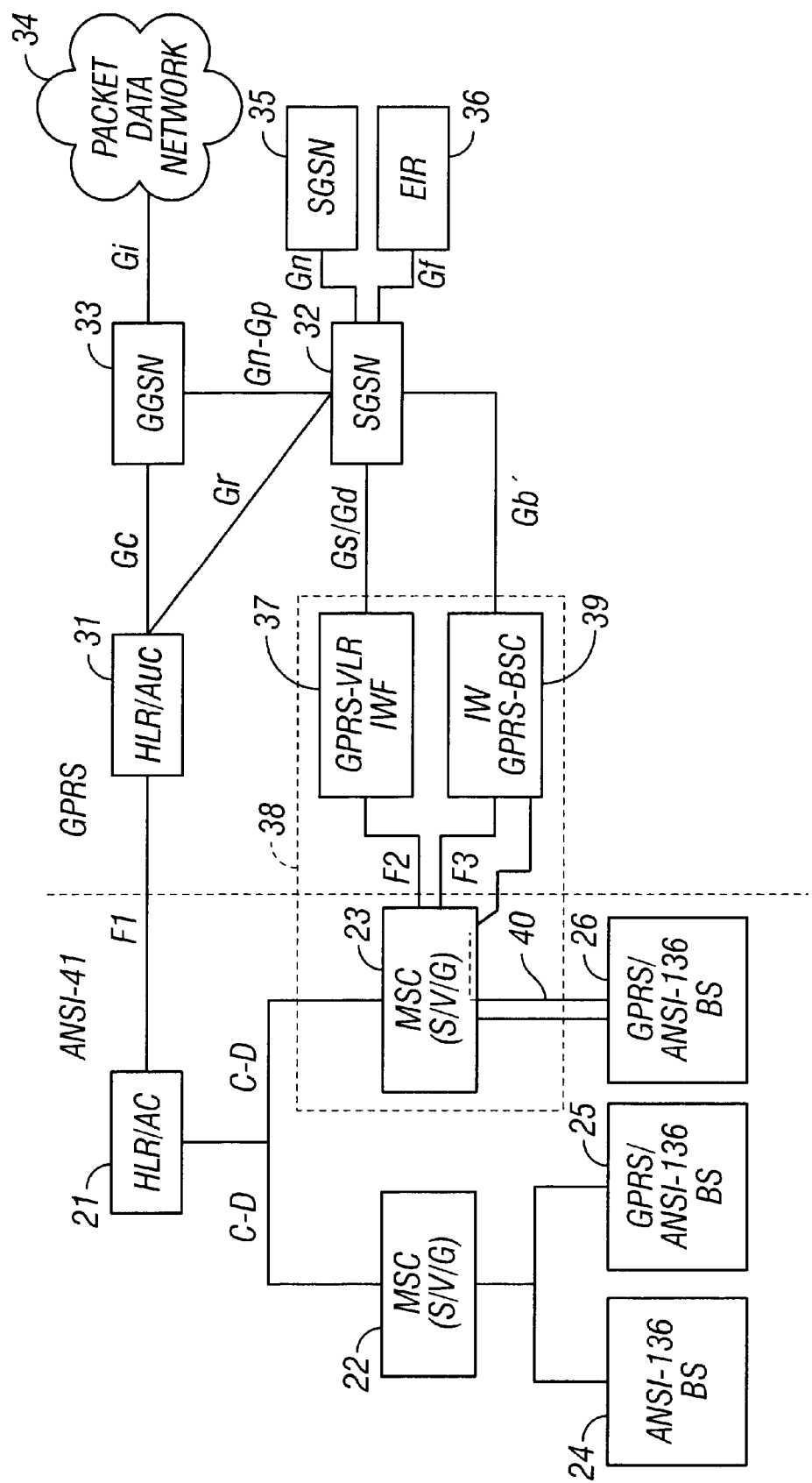
FIG. 2 is a simplified block diagram of an integrated GPRS/ANSI-41 network according to a first embodiment of the present invention.

FIG. 2 is a simplified block diagram of an integrated GPRS/ANSI-41 network according to a first embodiment of the present invention. On the ANSI-41 side of the network, there is an ANSI-41 Home Location Register/Authentication Center (HLR/AC) 21 which is connected by a CD interface to MSC/VLRs 22 and 23. The MSC/VLRs are illustrated to be either Serving, Visitor, or Gateway (S/V/G) MSCs. The MSC/VLRs, in turn, are connected to Base Stations (BSs) 24–26. Within the ANSI-41 network, access to the GPRS packet data network may be provided over a subset of a MSC/VLR's service area; therefore, FIG. 2 shows MSC/VLR 22 controlling one standard ANSI-136 base station and one GPRS/ANSI-136 base station. BS 24 is shown to be an ANSI-136 base station while BS 25 and BS 26 are shown to be GPRS/ANSI-136 base stations. The GPRS/ANSI-136 base stations are ANSI-136 base stations that are GPRS capable.

On the GPRS side, there is a GPRS Home Location Register/Authentication Center (HLR/AUC) 31 which is connected by a Gr interface to a Serving GPRS Switching Node (SGSN) 32, and is connected by a Gc interface to a Gateway GPRS Switching Node (GGSN) 33. The GGSN is connected by a Gi interface to a Packet Data Network 34, and is connected by a Gn-Gp interface to the SGSN 32. The GGSN, which is the GPRS equivalent of an Internet access gateway, and its interfaces are reused without modification. The SGSN may be connected by a Gn interface to other SGSNs 35 in the GPRS network, and by a Gf interface to an Equipment Identity Register (EIR) 36. The Gn interface from the SGSN to other SGSNs in the GPRS network is reused without modification. Likewise, the Gf interface from the SGSN to the EIR is reused without modification.

To support the integration of voice and packet data services without integrating too much of the GPRS and ANSI-41 functions, an interface is needed between the circuit switched serving node (such as MSC/VLR 23) and the packet switched serving node (such as SGSN 32). The interface is provided by introducing a new F2 interface between the MSC/VLR and a GPRS Visitor Location Register-Interworking Function (GPRS-VLR IWF) 37. The GPRS-VLR IWF then maps the signaling from the MSC/VLR and interfaces with the SGSN via a Gs/Gd interface protocol. Thus, one aspect of the GPRS/ANSI-41 integration is to map the signaling between the circuit switched serving MSC/VLR and the GPRS standard Gs/Gd interfaces. With this approach, the MSC/VLR 23 and the SGSN 32 are decoupled as much as possible with the GPRS-VLR IWF 37 to translate between them. In the embodiment shown in FIG. 2, the dotted box 38 indicates a specific implementation of the MSC/VLR 23 and the GPRS-VLRIWF 37. If the GPRS-VLRIWF is integrated into the MSC/VLR, there is no F2 open interface.

There are different types of mobile stations, and some can have simultaneous access to circuit switched and packet data services. For those mobile stations, the default mode is to access the GPRS network and then inform the associated circuit switched network that the mobile station is active and registered in the GPRS network. When the mobile station registers with the GPRS network, the SGSN 32 informs the MSC/VLR 23 of the registration through the interface between them. When this information is received in the MSC/VLR, it triggers the location updating function in the circuit switched network, and the location is updated in the ANSI-41 HLR/AC 21.

An interface (Gb') is also needed between the SGSN 32 and the GPRS/ANSI-136 base station 26. This interface is a modification of the GPRS-specified interface (Gb) which interfaces the SGSN with the GSM base station subsystem (BSS) (not shown). An Interworking GPRS Base Station Controller (IW GPRS BSC) 39 logically provides the termination of the Gb' interface from the SGSN 32. The IW GPRS BSC may be physically located at the base station, but this is not mandatory. The Gb' interface supports GPRS-specific signaling and data passing between the mobile station and the SGSN (i.e., traffic) which needs to go through the IW GPRS BSC. A radio resource management interface (F3) is implemented to connect the MSC/VLR Radio Resource Management Entity (RRME) with an associated component in the IW GPRS BSC.

A traffic interface 40 is provided between the IW GPRS BSC 39 and the GPRS/ANSI-136 base station 26. From the IW GPRS BSC, there is a semi-permanent connection through the MSC/VLR 23 to carry traffic to the GPRS/ANSI-136 base station. The traffic interface is not standardized, and is proprietary to each manufacturer. Packet switched signaling is utilized between the SGSN and the mobile station via the IW GPRS BSC and the GPRS/ANSI-136 base station. A relay function adapts the signaling format from the Gb' interface to the air interface signaling format for use at the base station. Lower layers of the interface are also adapted. This may be accomplished by adaptation from a clear T1 to a channelized T1, or between a channelized T1 and digital cross connects (DXC). The clear T1 is not segmented into multiplexed DS0s while the channelized T1 is segmented into 24 multiplexed DS0s. Thus, between the SGSN 32 and the IW GPRS BSC 39, there may be one or more logical DS0s, and the IW GPRS BSC may perform DXC functions. From the IW GPRS BSC to the GPRS/ANSI-136 base station 26, there may be one or more fixed DS0s allocated on a semi-permanent basis.

There may also be a F1 interface between the ANSI-41 HLR/AC 21 and the GPRS HLR/AUC 31 to ensure that the authentication status of the mobile station is maintained in the reciprocal network while the mobile station is in either circuit switched service mode or packet data service mode. Authentication functions are typically performed upon first access to the network, and authentication data is passed over the F1 interface between the HLRs. Thus, if the authentication is performed by the GPRS HLR/AUC, the F1 interface is utilized to inform the ANSI-41 HLR/AC of the successful authentication.

When the mobile station is registered in both networks, it can receive circuit switched calls during a packet data transaction. Circuit switched calls to the mobile station are delivered to the circuit switched serving MSC/VLR 23 where the mobile station is currently registered. The MSC/VLR utilizes the F2 interface through the GPRS-VLR IWF 37 to request the SGSN 32 to page the mobile station in preparation for delivering the circuit switched call. The SGSN pages the mobile station in the known location. The mobile station then responds to the page, and this fact is passed back to the MSC/VLR. The call is then completed through the GPRS/ANSI-136 base station 26.

Radio access in the GPRS network is multiple access, so all the users are multiplexed onto one channel for packet data access. This makes more efficient use of air interface resources, and also allows switching from the packet data mode to the circuit switched mode, and vice versa. Thus, the mobile station can switch from the packet data mode to a circuit switched air interface traffic channel to receive a call. When the call is completed, the mobile station switches back to the packet data mode.

Figure 3:
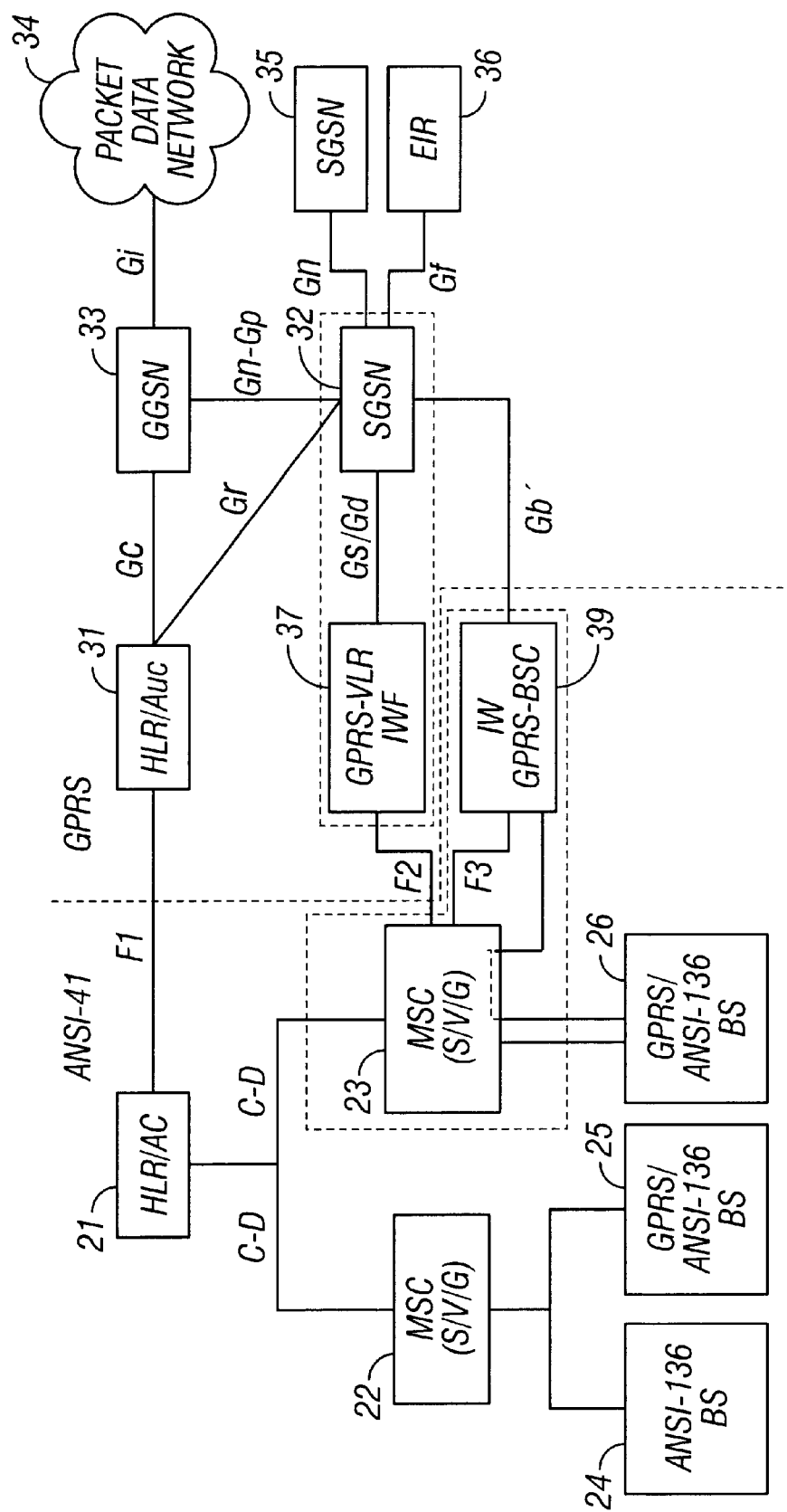
FIG. 3 is a simplified block diagram of an integrated GPRS/ANSI-41 network according to a second embodiment of the present invention.

FIG. 3 is a simplified block diagram of an integrated GPRS/ANSI-41 network according to a second embodiment of the present invention. In this embodiment, the GPRS-VLR IWF 37 is integrated with the SGSN 32 on the GPRS side of the interface. The IW GPRS BSC 39 is associated with the ANSI-41 network, and may be implemented with the MSC/VLR 23. The functionality described in relation to FIG. 2 remains the same.

Figure 4:
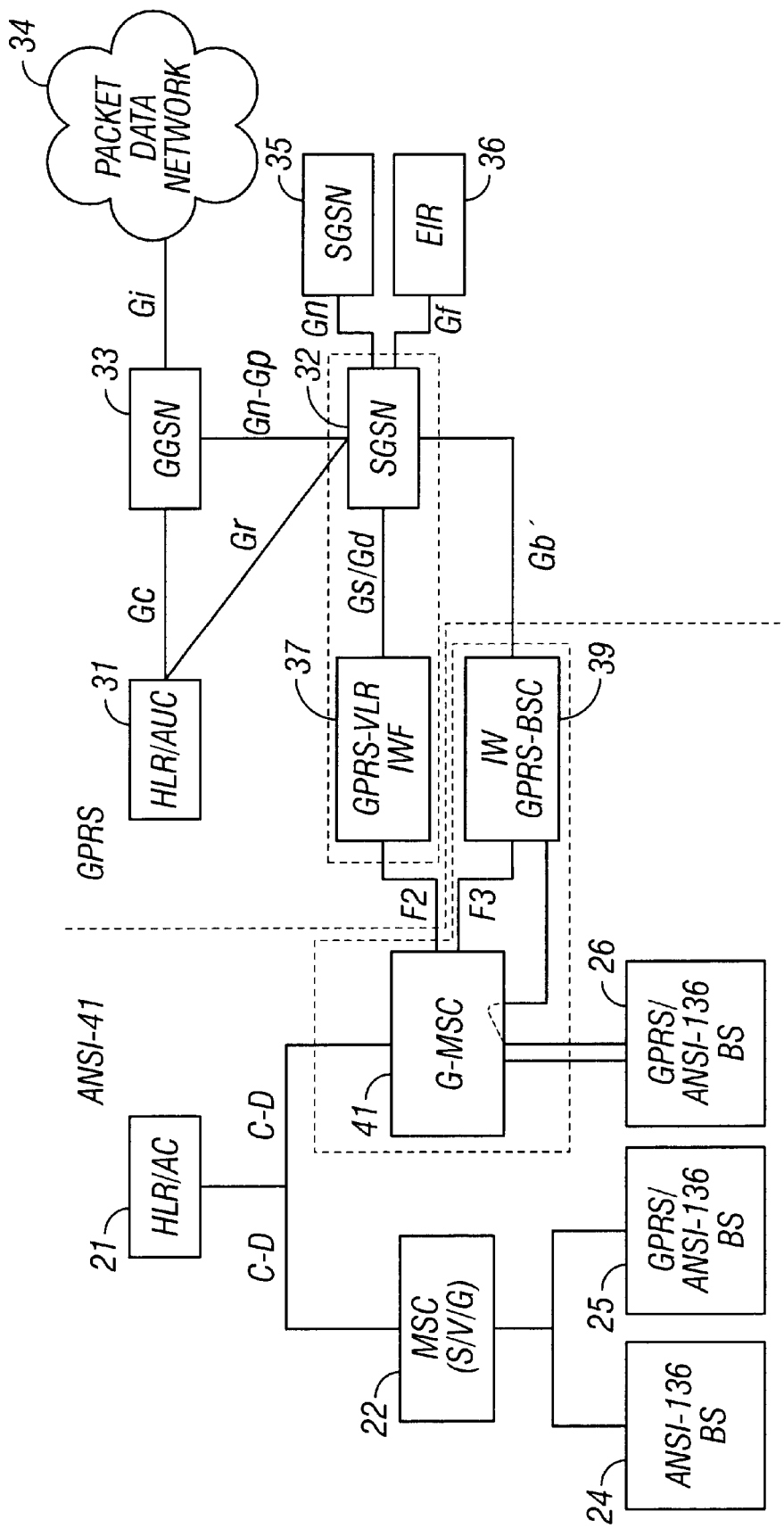
FIG. 4 is a simplified block diagram of an integrated GPRS/ANSI-41 network according to a third embodiment of the present invention.

FIG. 4 is a simplified block diagram of an integrated GPRS/ANSI-41 network according to a third embodiment of the present invention. In this embodiment, there is no F1 interface between the ANSI-41 HLR/AC 21 and the GPRS HLR/AUC 31. By modifying the ANSI-41 signaling, the ANSI-41 authentication center is informed upon initial registration and location update that the mobile station is making access on the GPRS network. The ANSI-41 HLR/AC may then defer authentication to the GPRS network until the mobile station changes back to the circuit switched network. When the mobile station makes access on the GPRS network, the SGSN 32 is notified. If it is a location update type of access, the SGSN initiates the location update signaling to the associated ANSI-41 circuit switched Gateway MSC 41. The Gateway MSC, in turn, performs the location update towards the HLR/AC 21 with Authentication Request (AUThREQ) and Registration Notification (REGNOT) messages. A new system access type is introduced with indicates that the mobile station has made an access on the GPRS network control channel.

Figure 5:
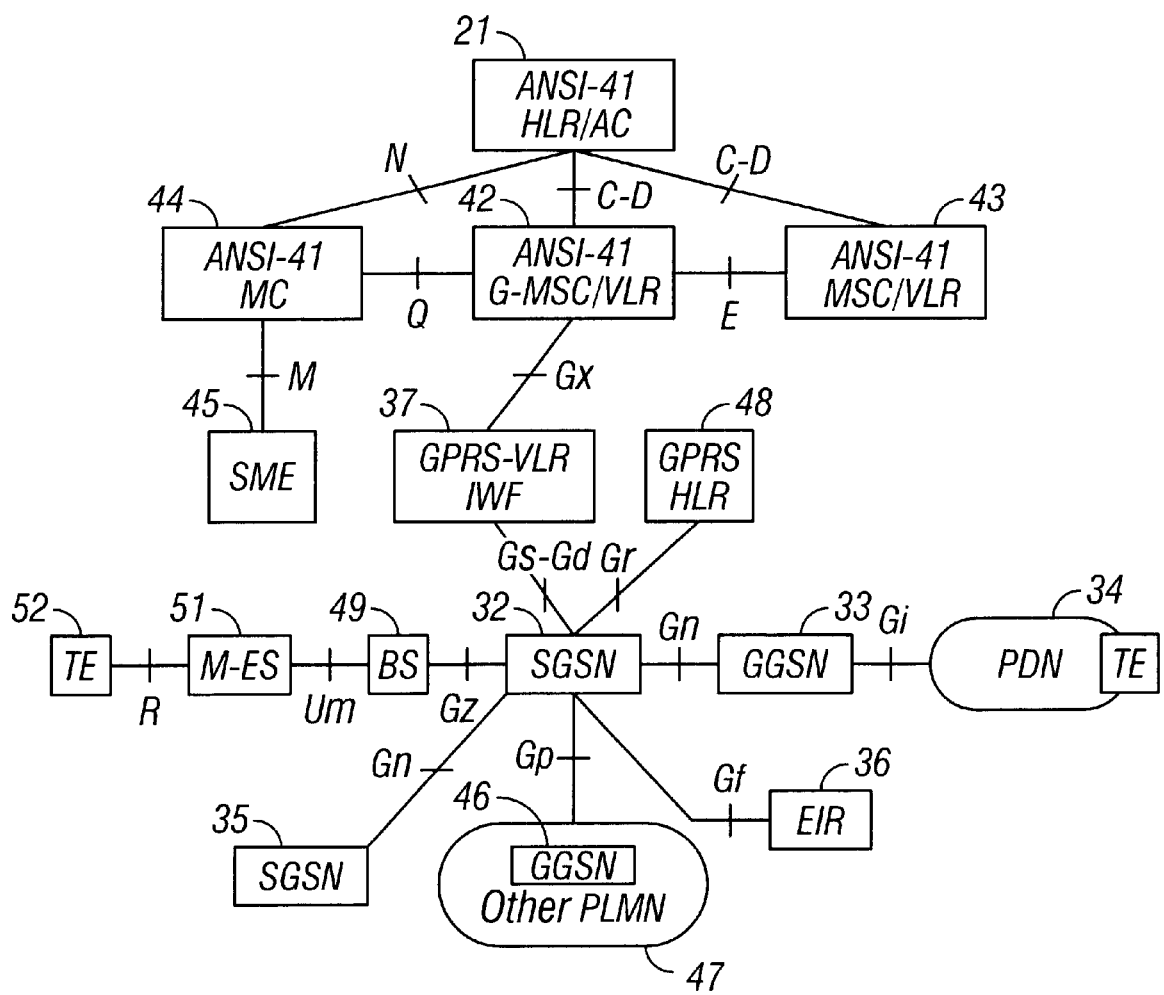
FIG. 5 is a simplified block diagram of an integrated GPRS/ANSI-41 network according to a fourth embodiment of the present invention.

FIG. 5 is a simplified block diagram of an integrated GPRS/ANSI-41 network according to a fourth embodiment of the present invention. GPRS integration with the ANSI-41 network is logically accomplished through the addition of two new network nodes, the ANSI-41 G-MSC/VLR42 and the GPRS-VLRIWF 37. The GPRS network structure is as currently defined in GSM standards. The SGSN 32 is the only GPRS node which is visible to the ANSI-41 network. The ANSI-41 portion of the network includes an ANSI-41 HLR/AC 21, an ANSI-41 Gateway MSC/VLR (G-MSC/VLR) 42, an ANSI-41 MSC/VLR 43, an ANSI-41 Message Center (MC) 44, and a Short Message Entity (SME) 45. The ANSI-41 G-MSC/VLR is connected to the GPRS portion of the network through the GPRS-VLR IWF 37.

The GPRS portion of the network includes a SGSN 32 which is connected to the GPRS-VLR IWF, a first GGSN 33 which is connected to the PDN 34, and a second GGSN 46 which is part of another PLMN 47. The SGSN 32 is also shown to be connected to a second SGSN 35, an EIR 36, a GPRS HLR 48 and a base station (BS) 49. The BS, in turn, is connected to a Mobile End System (M-ES) 51 and a Terminal Equipment (TE) 52. FIGS. 2–4 illustrated an Interworking GPRS Base Station Controller (IW GPRS-BSC) 39. In FIG. 5, the IW GPRS-BSC has been integrated into either the ANSI-41 G-MSC/VLR 42 or the BS 49.

The GPRS-VLR IWF 37 and the ANSI-41 G-MSC/VLR 42 are new network elements. The purpose of the GPRS-VLR IWF 37 is to act as a visitor location register from the point of view of the SGSN 32 when the mobile stations are Class D. From the point of view of the G-MSC/VLR 42, the GPRS-VLR IWF acts as a GPRS serving node. The GPRS-VLR IWF handles the following functions:

(1) Subscriber connection to the SGSN;

(2) Providing the network interface and protocol adaptation to and from the BSSAP+ of the Gs interface. Modified or new transactions may be required to handle the mobile station directives and orders originating from the ANSI-41 MSC-HLR complex;

(3) Handling of the Gx interface from and toward the ANSI-41 G-MSC/VLR42 for paging at call delivery, location update, suspend, and résumé, etc., for other potential mobile station directives, and for originating/terminating SMS messages; and (4) Sending SMS messages originating from the ANSI-41 network to the SGSN 32. In the GPRS-GSM network, this is a role played by the SMS gateway MSC (SMS-GMSC). However, the GPRSVLR IWF 37 is not required to examine the destination's M-ES address, and does not need to send a Send Routing Info For Short Message to the GPRS HLR 48, as this information is already provided by the ANSI-41 G-MSC/VLR 42.

The main benefit provided by the GPRS-VLR IWF 37 is that only minor changes are needed to the SGSN 32 as described above when interconnected to an ANSI-41 network. If deemed beneficial, the GPRS-VLR IWF can be integrated with the SGSN. In an introductory phase of ANSI-41 and GPRS integration, the GPRS-VLR IWF 37 and the ANSI-41 G-MSC/VLR 42 may be combined. In a later phase, they may be split and integrated with the SGSN and the MSC, respectively.

The ANSI-41 G-MSC/VLR 42 performs the following functions:

(1) Providing VLR functions for the purpose of PLMN circuit-switched services when the serving node is a GPRS SGSN, enabling gateway functions towards/from the GPRS network. This element performs paging control towards the SGSN 32 and registration handling towards the ANSI-41 HLR/AC 21.

(2) Providing cellular gateway functions when the serving node is a GPRS SGSN. Thus, call routing, call redirections, and supplementary service interactions are handled by the ANSI-41 GMSC/VLR.

The main benefit provided by the ANSI-41 G-MSC/VLR is that there is no need to update any ANSI-41 MSC/VLR when GPRS is introduced. If deemed beneficial, the ANSI-41 G-MSC/VLR 42 can be integrated with the ANSI-41 MSC/VLR 43.

The ANSI-41 HLR/AC 21, the SGSN 32, the BS 49, and the M-ES 51 are modified in the present invention. The ANSI 41 HLRIAC requires modification for the following reason. While being served by a packet control channel (PCCH) system, Class D mobile stations are handled by the GPRS network, including GPRS subscriber authentication. The ANSI-41 HLR/AC must know that the mobile station is being served by a PCCH system and that further authentication of the subscriber must be handled differently than when the mobile station is served by a DCCH or ACC.

The SGSN 32 is modified to handle tunneling of ANSI-41 specific messages and/or parameters to support MIN attach and authentication functionality such as MIN, ESN, COUNT, RANDC, etc. The BS 49 corresponds to the BSS in the GPRS reference model. It includes additional functions to handle ANSI-136 packet data channels at the MAC/RLC layer. It also handles the Gz interface towards the SGSN which is based on the Gb interface. The M-ES corresponds to the mobile data/voice terminal in the GPRS-ANSI reference model. It has new functionality to handle ANSI-136 packet data channels over the Um interface including the MAC/RLC layer, and higher layer protocol. This enables communication with the GPRS network, for instance with the SGSN 32.

The ANSI-41 MC 44, the ANSI-41 SME 45, the GPRS HLR 48, the EIR 36, and the GGSN 33 are unchanged.

The following interfaces are illustrated in FIG. 5.

C: This is an ANSI-41 signaling interface between the HLR/AC 21 and the MSC/VLR 43 for all application signaling involving MSC functions for call redirection, call transfer, etc.

D: This is an ANSI-41 signaling interface between the HLR/AC 21 and the MSC/VLR 43 for all application signaling involving VLR functions such as Call Delivery, Authentication, Location Tracking, mobile station directives, etc. The D interface is updated for Authentication Requests with an indication that the registration was made on the packet control channel. This is an additional data element in an existing data field which does not affect the MSC/VLR43, but only the G-MSC/VLR 42 and the HLR/AC 21.

E: This interface is only required if the G-MSC/VLR 42 and the MSC/VLR 43 are not integrated. The E interface is utilized to transfer the Unsolicited Response message from the serving MSC/VLR to the G-MSC/VLR.

Gx: This interface is only required if the G-MSC/VLR 42 and the GPRS-VLR IWF 37 are not integrated. The Gx interface conveys ANSI-41 messages to/from GPRS network signaling for transactions such as location updates, paging, authentication, SMS, etc.

Gz: This is a transport interface between the SGSN 32 and the BS 49. The Gz interface relays LLC PDUs for user data and control information.

Gd: This is a MAP-based signaling interface for SMS delivery and SMS origination signaling in the GPRS reference model. In the present invention, the Gd interface is supported between the GPRS-VLR IWF 37 and the SGSN to allow ANSI-41 SMS origination and delivery for mobile stations camping on the PCCH. The GPRS-VLR IWF delivers the terminating SMS messages to the SGSN when they are received from the G-MSC/VLR 42. The GPRS-VLR IWF delivers mobile station originating SMS messages to the G-MSC/VLR.

Gf: This is an optional MAP-based signaling interface used for terminal authentication.

Gi: This is an unchanged GPRS interface.

Gn: This is an unchanged GPRS interface.

Gp: This is an unchanged GPRS interface.

Gr: This is a MAP-based signaling interface between the SGSN 32 and the GPRS HLR 48 which is utilized for transactions such as authentication and retrieval of subscriber data.

Gs: This interface is used between the SGSN 32 and the GPRS-VLR IWF 37, and is only required if the SGSN and the GPRS-VLR IWF are not integrated. The Gs interface is implemented according to GPRS standards except that a smaller subset of currently defined messages is used, and some messages are modified to carry information for ANSI-41 integration. For example, information is carried for transactions such as location updates, paging, authentication, etc. Additional data such as MIN, ESN, COUNT, RANDC, etc. are transferred in the Location Updating Request message. The Gs interface is a subset of BSSAP.

M: This is an ANSI-41 signaling interface between the SME and the MC, from one MC to another MC, and from one SME to another SME. The M interface also serves as a transport interface for SMS messages.

N: This is an ANSI-41 signaling interface between the MC 44 and the HLR/AC 21.

Q: This is an ANSI-41 signaling interface between the MC 44 and the G-MSC/VLR 42. The Q interface also serves as a transport interface for SMS messages.

R: This is an unchanged GPRS interface.

Um: This is a radio interface according to TR45.3 standards.

Figure 6:
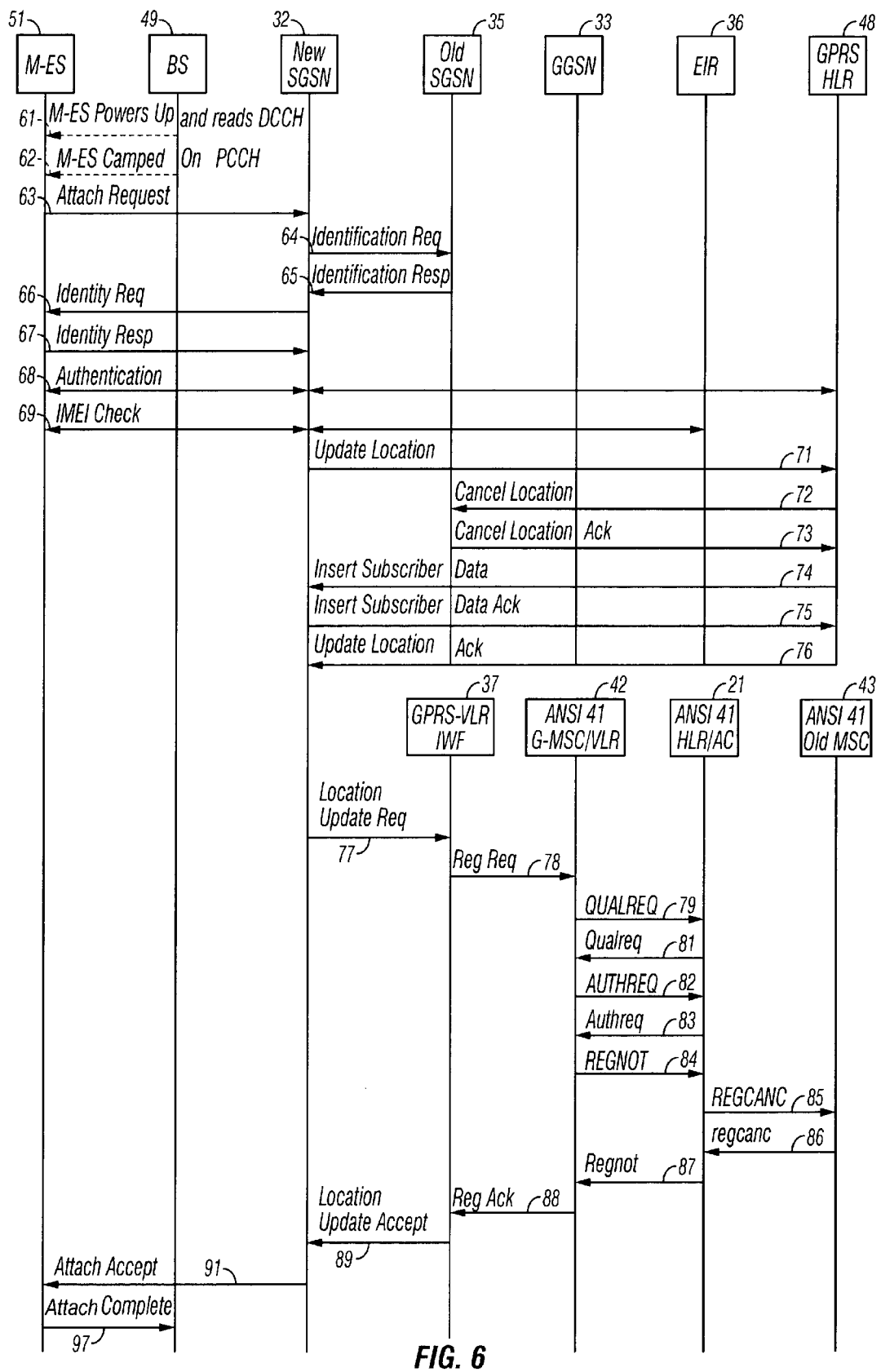
FIG. 6 is a message flow diagram illustrating the flow of signaling messages between the nodes of the integrated network of FIG. 5 when performing a GPRS attach procedure.

FIG. 6 is a message flow diagram illustrating the flow of signaling messages between the nodes of the integrated network of FIG. 5 when a Class D mobile end station (M-ES) performs a GPRS attach procedure.

In an attach procedure, the M-ES provides to its serving node, its MIN, IMSI or old P-TMSI and old RAI and an indication of which type of attach is to be executed. The different types of attach are GPRS attach, MIN attach, and combined GPRS/MIN attach. A GPRS attach is made to the SGSN. A GPRS-attached M-ES makes a MIN attach to an ANSI-41 node via the SGSN. A M-ES that is not GPRS-attached makes a MIN attach as defined in ANSI-41 standards.

The IMSI or old P-TMSI and old RAI are used as identifiers during the attach procedure until a new P-TMSI is allocated. The MIN is used for identification in the ANSI-41 network. After executing the GPRS attach, the M-ES is in a READY state, and MM contexts are established in the M-ES and the SGSN. The M-ES may then activate PDP contexts.

The SGSN number for this particular M-ES's location is stored in the GPRS-HLR so that changes in subscriber data can be communicated to the SGSN. If new subscriber data is received in the SGSN, and if the M-ES is GPRS-attached, the SGSN may, if required, command the M-ES to make a new GPRS attach and a new PDP context activation so that the new subscriber data is brought into use.

At 61, the M-ES 51 powers up and finds a DCCH, and begins reading F-BCCH and E-BCCH. If packet data service is not supported, or is supported but with a modulation scheme the M-ES is not capable of (or the M-ES does not desire packet data service), the M-ES remains in the DCCH Camping state and performs any necessary DCCH registration. If packet data service is supported using a modulation scheme the M-ES is capable of supporting and the M-ES desires packet data service, the M-ES tunes to the Beacon PCCH at 62 and reads FBCCH thereon to determine its Assigned PCCH. If not on its Assigned PCCH, the M-ES tunes to it. The M-ES reads NL information on its Assigned PCCH.

At 63, the M-ES makes its identity (the IMSI or P-TMSI) known to the new SGSN 32 by the transmission of an Attach Request (IMSI or P-TMSI and old RAI, Classmark, CKSN, Attach Type, DRX Parameters, old P-TMSI Signature, MIN, ESN, COUNT, RANDC, AUTHR) to the new SGSN. M-ES Class indicates that the M-ES is a Class-D M-ES (i.e., it uses ANSI-41 for circuit switched services). The Classmark contains the M-ES's ANSI-136 multi-slot capabilities and supported GPRS ciphering algorithms. Attach Type indicates which type of attach procedure is to be performed (i.e., GPRS Attach only, MIN Attach only, or a combined GPRS and MIN Attach). Combined GPRS and MIN attach is also used in the case of a GPRS Attach when the M-ES is already MIN-attached. The DRX Parameters indicate whether or not the M-ES uses discontinuous reception. If the M-ES uses discontinuous reception, then the DRX Parameters also indicate when the M-ES is in a non-sleep mode able to receive paging requests and channel assignments. The DRX Parameters are mapped to the ANSI-41 Paging Frame Class. If the M-ES uses its old P-TMSI for identifying itself, and if it has also stored its old P-TMSI Signature, then the M-ES includes the old P-TMSI Signature in the Attach Request message. Note that new parameters must be added to the GPRS Attach message (MIN, ESN, COUNT, RANDC, and AUTHR). In addition, the Classmark indicates ANSI-136 multi-slot capability (i.e., 1 to 3 time slots instead of 1 to 8 time slots).

Steps 64–75 are performed as described in FIG. 15, Section 6.5 of GSM 03.60, which is hereby incorporated by reference herein. At 64, an Identification Request is sent from the new SGSN 32 to the old SGSN 35. The old SGSN responds with an Identification Response message 65. At 66, an Identity Request is sent from the new SGSN to the M-ES 51. The M-ES responds with an Identity Response message 67. An authentication procedure is then performed at 68 between the M-ES, the new SGSN, and the GPRS HLR 48. At 69, an IMEI check is performed between the M-ES, the new SGSN, and the EIR 36.

At 71, the new SGSN 32 sends an Update Location message to the GPRS HLR 48. The GPRS HLR then sends a Cancel Location message 72 to the old SGSN 35 which responds at 73 with a Cancel Location Acknowledgment. At 74, the GPRS HLR sends subscriber data to the new SGSN which sends an acknowledgment at 75. The GPRS HLR then acknowledges the Update Location message at 76. If a MIN attach is performed, the SGSN forwards the MIN attach via the GPRS-VLR IWF 37 to the ANSI 41 G-MSC/VLR 42. The GPRS-VLR IWF number is derived from the RA information. If the M-ES is already MIN-attached and is doing a Combined GPRS/MIN attach, an association is created by sending a Location Updating Request via the GPRS-VLR IWF to the ANSI 41 G-MSC/VLR. This marks the M-ES as GPRS-attached in the ANSI 41 G-MSC/VLR.

At 77, the new SGSN 32 sends a Location Updating Request (with new LAI, IMSI, SGSN Number, M-ES Class, MIN, ESN, COUNT, RANDC, and AUTHR) to the GPRS-VLR IWF 37. The GPRS-VLR IWF creates an association with the new SGSN by storing the SGSN Number and M-ES Class. The GPRS-VLR IWF stores MIN and IMSI in order to perform address translation. The MIN, ESN, COUNT, RANDC, and AUTHR parameters must be added to the Location Updating Request message. At 78, the GPRS-VLR IWF sends a Registration Request message with MIN, ESN, COUNT, RANDC, and AUTHR to the ANSI-41 G-MSCNLR 42 using the Gx interface. The ANSI-41 G-MSC/VLR sends a Qualification Request (QUALREQ) Invoke message 79 to the ANSI-41 HLR/AC 21 in order to readily perform subscriber profile validation. MIN addressing and ESN are used to identify the subscriber in this query transaction.

The ANSI 41 HLR/AC 21 identifies the M-ES 51 and returns the subscriber profile in a QUALREQ Return Result message 81 to the ANSI-41 G-MSC/VLR 42 upon successful validation of the subscriber. At 82, the ANSI-41 G-MSC/VLR sends an Authentication Request (AUTHREQ) Invoke message to the ANSI-41 HLR/AC 21. This message includes information indicating that the Registration has been performed on the Packet Control channel. The "System Access Type" parameter in the AUTHR message is given a new value, "PCCH access", indicating to the ANSI-41 HLR/AC that the attach was performed via GPRS.

The ANSI-41 HLR/AC 21 responds by sending an AUTHREQ Return Result message 83 to the ANSI-41 G-MSC/VLR 42. The ANSI-41 G-MSC/VLR then sends a Registration Notification (REGNOT) Invoke message 84 with the MIN, ESN, COUNT, RANDC, and AUTHR to the ANSI-41 HLR/AC. If the REGNOT message implies a MSC change, the HLR/AC sends a Registration Cancellation (REGCANC) Invoke message 85 to the ANSI-41 old MSC 43. This is done in the case of GPRS attach for an M-ES that was already MIN attached to a different MSC. The ANSI-41 old MSC acknowledges with a REGCANC Return Result message 86.

After completing the inter-MSC registration notification procedures, the ANSI-41 HLR/AC 21 responds by sending a REGNOT Return Result message 87 to the ANSI-41 G-MSC/VLR 42. The ANSI-41 G-MSC/VLR then sends a Registration Acknowledgment 88 to the GPRS-VLR IWF 37. The GPRS-VLR IWF responds with a Location Updating Accept message 89 to the new SGSN 32. The new SGSN sends an Attach Accept message 91 to the M-ES 51 and includes the PTMSI, PLMN-supported MT-capabilities, and P-TMSI Signature. If the P-TMSI has changed, the M-ES acknowledges the received P-TMSI with an Attach Complete message 92 which includes the P-TMSI. If the Attach Request cannot be accepted, the new SGSN returns an Attach Reject message (not shown) to the M-ES and includes the IMSI and Cause.

Table 1 below summarizes the changes made to various messages and information elements described above.

TABLE 1

| Message/Info. Element | Change | Comment |
| --- | --- | --- |
| Attach Request | New Parameters | MIN, ESN, COUNT, RANDC, AUTHR |
| M-ES Class | New M-ES Classes | Class D = ANSI-41 Class B equivalent Class E = GPRS Class C except only capable of operating over 30 kHz channels |
| Classmark | New Meaning | Indicates ANSI-136 multi-slot capability (full rate to triple rate = 1 to 3 TS) |
| Location Updating Request | New Parameters | MIN, ESN, COUNT, RANDC, AUTHR |
| ANSI-41 System Access Type | New Parameter Value | Indicating "PCCH Access" in the AUTHREQ message |

Figure 7:
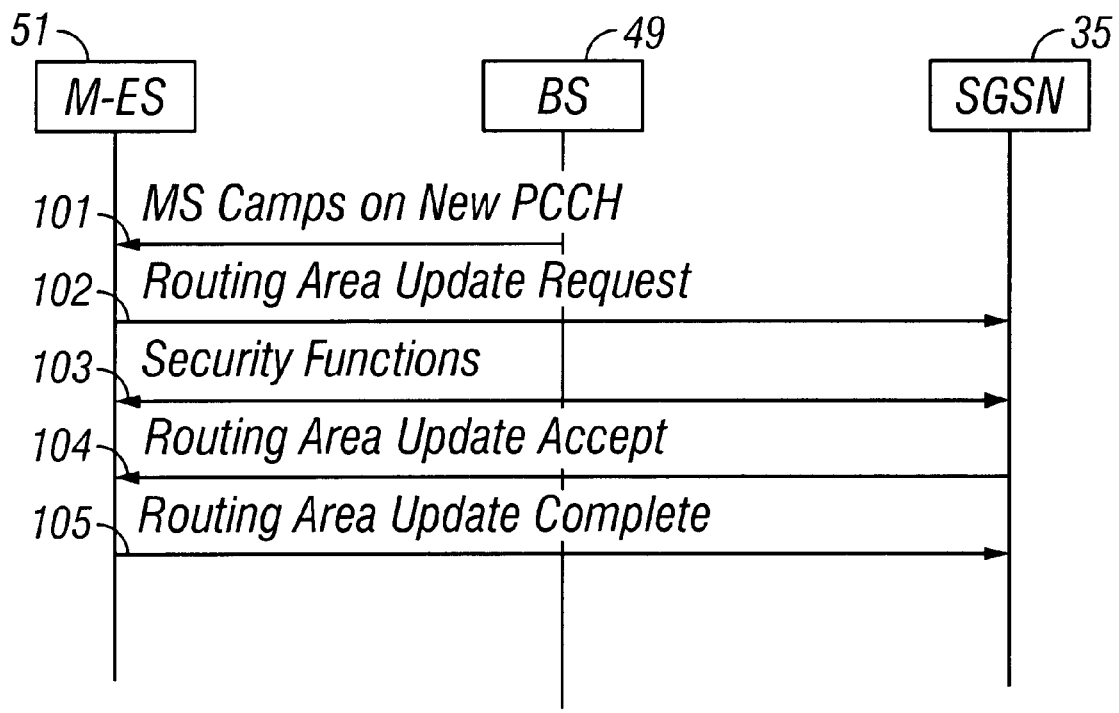
FIG. 7 is a message flow diagram illustrating the flow of signaling messages during an Intra-SGSN Routing Area Update procedure.

FIG. 7 is a message flow diagram illustrating the flow of signaling messages during an Intra-SGSN Routing Area (RA) Update procedure. An RA Update is performed when a GPRS-attached M-ES in STANDBY or READY state detects that it has entered a new RA or when the periodic RA update timer has expired. The SGSN detects that the update is an intra-SGSN routing area update because the SGSN also handles the old RA. In this case, the SGSN has the necessary information about the M-ES, and there is no need to inform the GGSNs or the GPRS HLR about the new M-ES location. A periodic RA update is always an intra-SGSN routing area update. An M-ES in READY state due to anonymous access does not perform RA updates. If the M-ES has entered a new routing area, a new Anonymous Access PDP Context Activation procedure is initiated. The old context is implicitly deleted upon expiry of the READY timer.

FIG. 7 assumes a simple case involving the M-ES 51, the BS 49, and the currently serving SGSN 35 of FIG. 5. At step 101, the M-ES 51 acquires services on a new serving PCCH and reads a full cycle of broadcast information. The broadcast information includes the neighbor list (NL), the serving cell's list of coincidental DCCH coverage, and a Routing Area Identity. When a new Routing Area Id is detected, the MS then sends a Routing Area Update Request 102 to the SGSN and includes ANSI-41 subscriber identification and authentication data (MIN, ESN, AUTHR, RAND, etc.) in addition to the old RAI, and the old P-TMSI Signature. The BS adds an identifier of the cell where the message was received before passing the message to the SGSN. The SGSN derives the new RAI from the added cell identifier (see GSM 08.18). At 103, security functions may be executed. These procedures are defined in sub-clause "Security Function" of GSM 3.60. GPRS Security procedures may be invoked towards the M-ES such as, for example, Authentication.

The SGSN 35 then validates the M-ES's presence in the new RA according to the procedure specified in GSM 3.60. If due to regional, national, or international restrictions the M-ES is not allowed to attach in the RA, or subscription checking fails, then the SGSN rejects the RA update with an appropriate cause. If all checks are successful then the SGSN updates the MM context for the M-ES. A new P-TMSI may also be allocated. A Routing Area Update Accept message 104 (with P-TMSI, P-TMSI Signature) is then returned to the MS. If the P-TMSI was reallocated, the M-ES acknowledges the new P-TMSI with a Routing Area Update Complete message (with P-TMSI).

If the RA Update procedure fails a maximum allowable number of times, or if the SGSN returns a Routing Area Update Reject (Cause) message, the M-ES 51 enters the IDLE state. To the integrated network, this means that an implicit Detach is effected which forces the M-ES to return to DCCH camping using the serving cells coincidental DCCH pointer(s) acquired when getting service on the PCCH.

Table 2 below summarizes the changes made to various messages and information elements described above.

TABLE 2

| Message/Info. Element | Change | Comment |
| --- | --- | --- |
| Routing Area Update | New Parameters | MIN, ESN, COUNT, RANDC, AUTHR |

Figure 8:
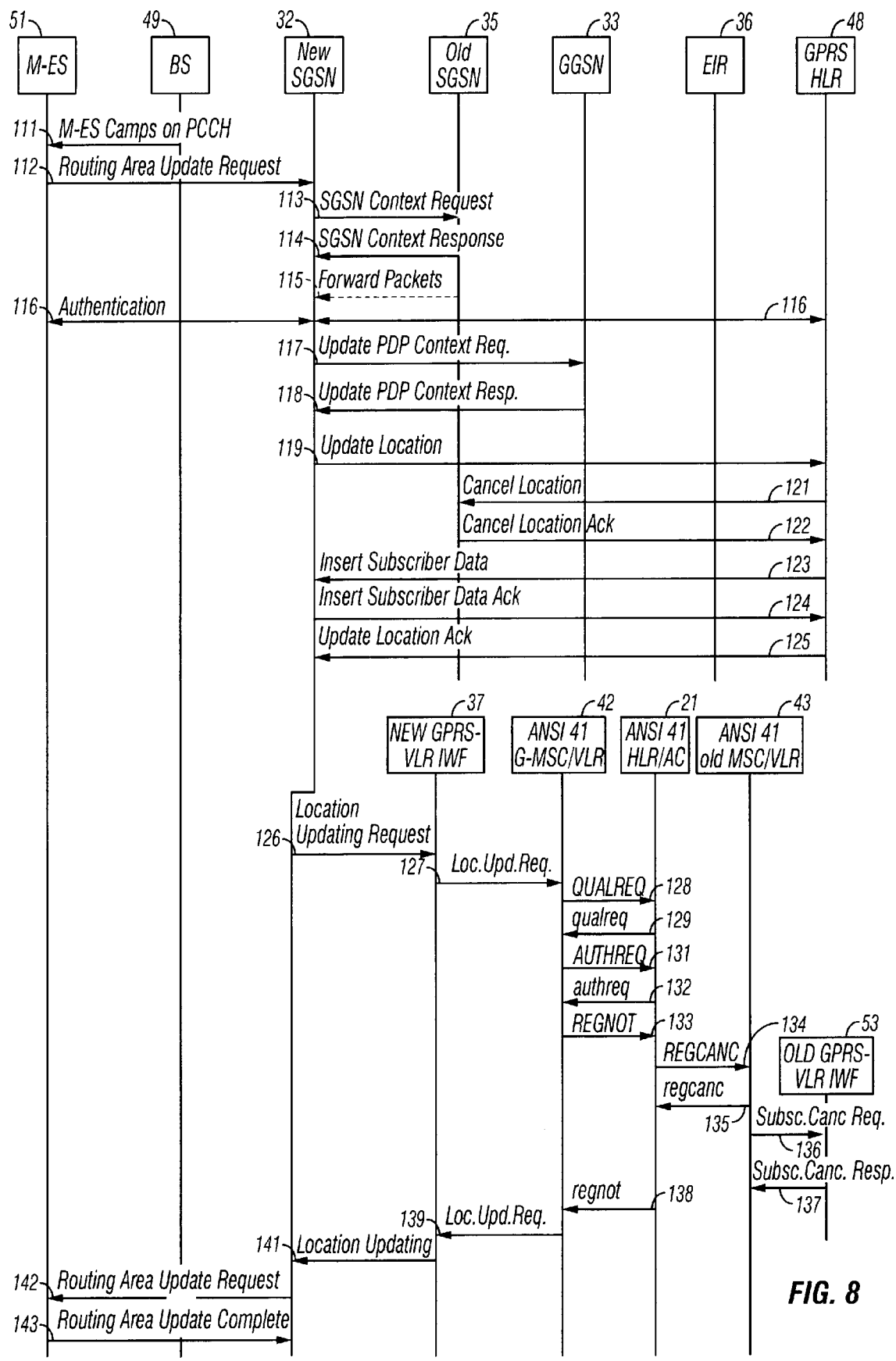
FIG. 8 is a message flow diagram illustrating the flow of signaling messages during an Inter-SGSN Routing Area Update procedure.

FIG. 8 is a message flow diagram illustrating the flow of signaling messages during an Inter-SGSN Routing Area Update procedure when the M-ES is in the STANDBY state. It is assumed that the new SGSN 32 is connected to a new ANSI-41 G-MSC through an associated new GPRS-VLR IWF 37. At 111, the M-ES 51 reselects the new cell's PCCH, and reads a full cycle of broadcast information including the neighbor list, the serving cell's list of coincidental DCCH coverage, and Routing Area and Location Area Indicators (RAI and LAI). The M-ES acquires services on the new serving PCCH and discovers a new Routing Area Id and Location Area Id. The M-ES then sends a RA Update Request message 102 to the new SGSN 32. If the M-ES is MIN-attached, and if the RA Update request 102 requires a combined RA/LA, then before invoking a location update, the SGSN validates the M-ES's presence in the new RA. If due to regional, national or international restrictions the M-ES is not allowed to attach in the RA or subscription checking fails, then the process moves to step 142. Otherwise, ANSI-41 subscriber identification and authentication data (MIN, ESN, AUTHR, RAND, etc.), in addition to the old RAI, and old P-TMSI Signature to the SGSN are transmitted in the RA Update Request. Steps 113 through 125 are the same as described in steps 2 through 9 in GSM 3.60 V 6.0.0 section 6.9.1.3.2. At 113, the new SGSN 32 sends a SGSN Context Request message to the old SGSN 35, and the old SGSN returns a SGSN Context Response 114. The old SGSN then forwards packets to the new SGSN at 115. At 116 authentication procedures are performed between the M-ES 51, the new SGSN 32, and the GPRS HLR 48. At 117, the new SGSN sends an Update PDP Context Request to the GGSN 33, and the GGSN returns an Update PDP Context Response 118.

The new SGSN 32 then sends an Update Location message 119 to the GPRS HLR 48. The GPRS HLR then sends a Cancel Location message 121 to the old SGSN 35, and the old SGSN returns a Cancel Location Acknowledgment 122. At 123, the GPRS HLR sends an Insert Subscriber Data message to the new SGSN which returns an acknowledgment at 124. The GPRS HLR then returns an Update Location Acknowledgment 125 to the new SGSN.

The SGSN then identifies the GPRS-VLR IWF number (or Id) from the RAI using an internal translation table, and a location update procedure is performed in steps 126 through 141. The new SGSN forwards a Location Update Request 126 to the new GPRS-VLR IWF 37 and includes the M-ESs identification and authentication data (MIN, ESN, AUTHR, etc.). The new SGSN stores the new GPRS-VLR IWF number/identity. The new GPRS-VLR IWF 37 informs the new ANSI-41 G-MSC/VLR 42 of the subscriber's implicit MIN-Attach by forwarding a "Location Update request" 127 including the M-ES's identification and authentication data (MIN, ESN, AUTHR, etc.). Note that the association between GPRS-VLR IWF and ANSI-41 G-MSC is one-to-one.

The new ANSI-41 G-MS/VLR 42 sends a QUALREQ Invoke message 128 towards the ANSI-41 HLR/AC 21 in order to readily perform subscriber profile validation. MIN addressing and ESN are used to identify the subscriber in this query transaction. The ANSI-41 HLR/AC then identifies the M-ES 51 and returns the profile in a qualreq return result message 129 to the ANSI-41 G-MSC/VLR upon successful validation of the subscriber. Authentication procedures are required at the MSC or AC level. The ANSI-41 G-MSC identifies the M-ES's ANSI-41 HLR/AC, and forwards an AUTHREQ Invoke message 131 to the identified HLR/AC. Tentatively, the SystemAccessType parameter in the AUTHREQ Invoke message is utilized to indicate an access on a PCCH. In this manner, the ANSI-41 HLR/AC is informed to apply a specific authentication procedure, such as the need to buffer Authentication and possibly other MS directives, until the M-ES returns on either a DCCH or DTC.

When the system access type indicates access on the PCCH, the ANSI-41 HLR/AC 21 applies the authentication response algorithm associated with the PCCH access type. For instance, AC initiated unique challenge, SSD updates, and COUNT history updates are deferred or buffered. At 132, an Authentication request response is returned for the specified subscriber. Upon successful MS authentication, the new ANSI-41 G-MSC/VLR 42 sends a Registration Notification message 133 and includes the new ANSI-41 G-MSC/VLR Id. to inform the subscribers home system ANSI-41 HLR/AC 21 of the subscriber's new ANSI-41 GMSC/VLR location.

The M-ES's home ANSI-41 HLR/AC then validates the M-ES location update request. Upon a successful M-ES location update process, the M-ES's ANSI-41 HLR/AC sends a Registration Cancellation Request 134 to the M-ES's previous location (old ANSI-41 MSC/G-MSC 43) to remove the M-ES from its database. The following sequence must be performed. First, the old ANSI-41 MSC/VLR 43 replies to the ANSI HLR/AC with a registration cancellation return result message 135. Next, the old ANSI-41 MSC/VLR sends a Subscriber Cancellation Request 136 to the M-ES's old GPRS-VLR IWF 53 to remove any reference to the subscriber being connected to the SGSN through the old GPRS-VLR IWF. The old GPRS-VLR IWF acknowledges at 137. Upon successful M-ES validation, the ANSI-41 HLR/AC 21 responds accordingly by sending the subscriber's profile in a registration notification return result message 138 to the ANSI-41 G-MSC/VLR 42 using the stored node Id. The ANSI-41 G-MSC/VLR then sends a Location Update Request Acknowledgment 139 to the associated GPRS-VLR IWF 37. At 141, the new GPRS-VLR IWF replies to the new SGSN's Location Update Request message 126 by sending a Location Update Acknowledgment to the new SGSN 32.

When the RA or subscription checking has failed, then the new SGSN 32 rejects the RA Update with an appropriate cause. The ANSI-41 authentication result is forwarded to the M-ES 51. If all checks are successful, then the new SGSN establishes MM and PDP contexts for the M-ES. A logical link is established between the new SGSN and the M-ES. The new SGSN responds to the M-ES with a Routing Area Update Accept message 142 (with P-TMSI, VLR TMSI, LLC Ack, and P-TMSI Signature). The LLC Ack parameter contains the acknowledgments for each LLC connection used by the M-ES, thereby confirming all mobile-originated N-PDUs successfully transferred before the start of the update procedure. The ANSI-41 authentication result is new information returned to the M-ES. The M-ES confirms the reallocation of the TMSIs by sending a Routing Area Update Complete message 143 (with P-TMSI, VLR TMSI, and LLC Ack) to the new SGSN. The LLC Ack parameter contains the acknowledgments for each LLC connection used by the M-ES, thereby confirming all mobile-terminated N-PDUs successfully transferred before the start of the update procedure. If LLC Ack confirms reception of N-PDU's that were forwarded from the old SGSN, then these N-PDUs are discarded by the new SGSN. LLC and SNDCP in the M-ES are reset locally.

In the case of a rejected routing area update operation, due to Routing Area restrictions, the new SGSN does not construct an MM context. A reject is returned to the M-ES with an appropriate cause. The M-ES does not re-attempt a routing area update to that RA. The RAI value is deleted when the M-ES is powered-up. In the case of no reply from the GGSN, the new SGSN does not construct an MM context. A reject is returned to the M-ES with an appropriate cause. The M-ES may re-attempt updating to the same RA. As an option the new SGSN may retry the operation before rejecting the routing area update.

If the routing area update procedure fails a maximum allowable number of times, or if the SGSN returns a Routing Area Update Reject (Cause) message, the M-ES enters the IDLE state. An implicit Detach is effected which forces the M-ES to return to DCCH camping using the serving cell's coincidental DCCH pointer(s) acquired when getting service on the PCCH. If the RA Update timer expires, and no Cancel Location (IMSI) was received from the HLR, then the old SGSN 35 stops forwarding N-PDUs to the new SGSN 32, and proceeds as if the SGSN Context Request message 113 was not received. If the Location Updating Accept message 141 indicates a reject, then this is indicated to the M-ES 51, and the M-ES does not access non-GPRS services until a successful location update is performed.

Table 3 below summarizes the changes made to various messages and information elements described above.

TABLE 3

| Message/Info. Element | Change | Comment |
| --- | --- | --- |
| Routing Area Update | New Parameters | MIN, ESN, COUNT, RANDC, AUTHR |
| M-ES Class | New M-ES Class | Class D = ANSI-41 Class B equivalent |
| Classmark | New Meaning | Indicates ANSI-136 multi-slot capability (full rate to triple rate = 1 to 3 TS) |
| Location Updating Request | New Parameters | MIN, ESN, COUNT, RANDC, AUTHR |
| ANSI-41 System Access Type | New Parameter Value | Indicating "PCCH Access" in the AUTHREQ message |

Table 4 below provides additional information for the Gx interface.

TABLE 4

| Message/Info. Element | Meaning | Comment |
| --- | --- | --- |
| Reg Request | Registration | |
| Reg Ack | | |
| Cancellation | Cancellation of the M-ES record in the old GPRS-VLR IWF at change of ANSI-41 G-MSC | |
| Cancellation Ack | | |

Inter-SGSN Routing Area Reselection when the M-ES is in the READY state is performed in the same manner as FIG. 8.

Figure 9:
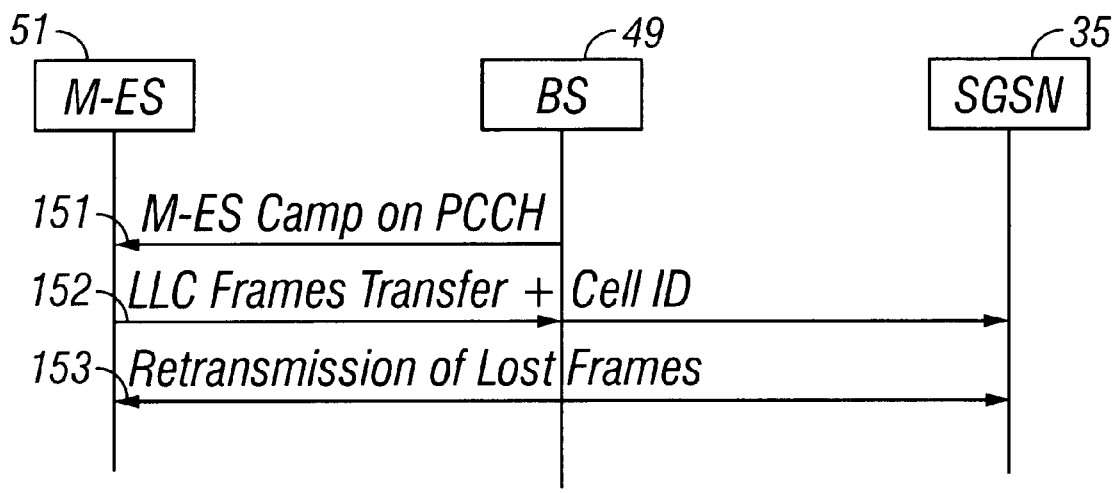
FIG. 9 is a message flow diagram illustrating the flow of signaling messages during a Cell Update procedure when a M-ES in the READY state enters a new cell in the current Routing Area.

FIG. 9 is a message flow diagram illustrating the flow of signaling messages during a Cell Update procedure when an M-ES in the READY state enters a new cell in the current Routing Area. An M-ES in the READY state due to Anonymous Access does not perform routing area updates. If the M-ES has entered a new routing area, a new Anonymous Access PDP Context Activation procedure is initiated. The old context is implicitly deleted upon expiration of the READY timer. A cell update takes place when the M-ES enters a new cell inside the current RA, and the M-ES is in the READY state. If the RA has changed, an RA Update is executed instead of a cell update.

At 151, the M-ES 51 reselects the new cell's PCCH, and reads a fill cycle of broadcast information. The broadcast information includes the neighbor list, the serving cell's list of coincidental DCCH coverage, and Routing Area and Location Area Indicators. The M-ES acquires services on the new serving PCCH and automatically resumes transmission on the new channel at 152 by transmitting an uplink LLC frame of any type containing the M-ES's identity to the SGSN 35. The cell update consists of any correctly received and valid LLC PDU carried inside a BSGP PDU. The BS 49 adds the identifier of the cell to all BSGP frames transmitted towards the SGSN. The SGSN notices the cell update when the BSGP frames contain the cell identifier of a new cell.

Note: From an RLC perspective, the proper mechanism must be in place to enable the M-ES to résumé reception/transmission on the new channel with the least penalty in delay. The SGSN records the M-ES's change of cell, and further directs traffic towards the M-ES over the new cell. The SGSN is responsible for buffering and retransmitting unacknowledged LLC frames at 153, when acknowledged mode is used.

Figure 10:
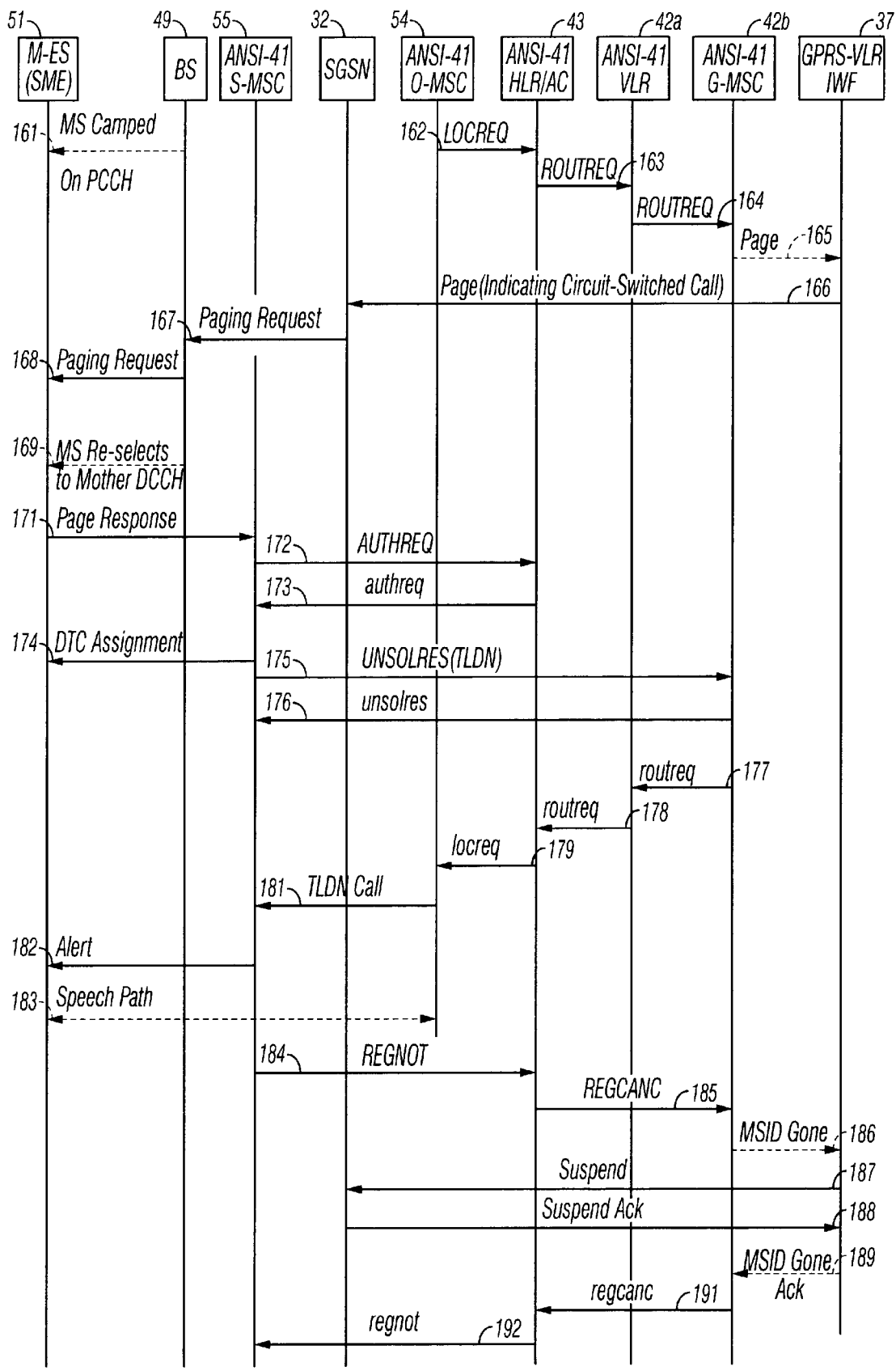
FIG. 10 is a message flow diagram illustrating the flow of signaling messages between the nodes of the integrated network of FIG. 5 when an incoming voice call is received for a M-ES in the STANDBY state.

FIG. 10 is a message flow diagram illustrating the flow of signaling messages between the nodes of the integrated network of FIG. when an incoming voice call is received for a M-ES in the STANDBY state. A mobile station in the STANDBY state is assumed to have already performed a successful Power Up Attach and has therefore already received a TLLI assignment. In this case an incoming voice call is first received by the ANSI-41 infrastructure and forwarded to the GPRS infrastructure. Communications between the GPRS-VLRIWF 37 and the ANSI-41 G-MSC 42b are shown using a dotted line to indicate the messages are not required to follow the ANSI-41 MAP format.

At 161, a Class-D M-ES 51 is camped on a PCCH served by the SGSN 32. It has already performed a successful GPRS Attach procedure and has therefore already received a TLLI assignment. Upon receiving an incoming call for the M-ES, an Originating MSC (O-MSC) 54 sends a LOCREQ Invoke message 162 (indicating a voice call) to the ANSI-41 HLR/AC 43 corresponding to the called network address. Upon receiving the LOCREQ message, the ANSI-41 HLR/AC identifies the target MSID associated with the called address and sends a ROUTREQ Invoke message 163 (indicating a voice call) to the ANSI-41 VLR 42a. Upon receiving the ROUTREQ message, the ANSI-41 VLR sends a ROUTREQ Invoke message 164 (indicating a voice call) to the ANSI-41 G-MSC 42b serving the target MSID. Upon receiving the ROUTREQ message, the ANSI-41 G-MSC sends a Page message 165 to its associated GPRS-VLR IWF 37 and starts a page response timer for the target MSID included in the Page message.

The GPRS-VLRIWF 37 converts the target MSID to its associated GPRS IMSI and then sends the SGSN 32 a Page message 166 (with the IMSI, Channel Needed, and Priority). Priority consists of the circuit-switched paging priority parameter as defined in GSM 08.08. The SGSN maps Priority to QoS. The SGSN then sends a BSGP Paging Request message 167 (with IMSI, TLLI, Area, Channel Needed, and QoS) to the BS 49 serving the M-ES 51. TLLI and Area are derived from the M-ES's MM context in the SGSN. Area indicates a single cell for an M-ES in the READY state or a Routing Area for an M-ES in the STANDBY state. Channel Needed is only included if received from the GPRS-VLR IWF. If Channel Needed was not received from the GPRS-VLR IWF, then a default Channel Needed parameter indicating circuit-switched paging is included by the SGSN. QoS indicates the priority of this Paging Request relative to other Paging Request messages buffered by the BS.

The BS 49 translates the incoming BSGP Paging Request message into one radio Paging Request message per cell. If a dedicated radio resource is assigned to the M-ES in a cell (e.g. the M-ES is in the READY state), then the BS transmits one Paging Request message 168 (with IMSI, TLLI, and Channel Needed) on this radio resource, without stopping potentially ongoing data transfers. Otherwise, the BS pages the M-ES with one Paging Request message on the appropriate paging channel in each addressed cell. This is described in GSM 03.64.

Upon receipt of a Paging Request message for a circuit-switched service, the M-ES 51 may decide to respond to the request. If the M-ES accepts the circuit-switched service, it tunes to the Mother DCCH and begins reading F-BCCH information at 169. Upon receiving a complete cycle of F-BBCH information, the M-ES begins looking for an access opportunity on the RACH. Upon finding an access opportunity, the M-ES sends a Page Response message 171 to an ANSI-41 Serving MSC (S-MSC) 55. Upon receiving the Page Response message the ANSI-41 S-MSC determines that the response is unsolicited. The ANSI-41 S-MSC then sends an Authentication Request (AUTHREQ) Invoke message 172 to the ANSI-41 HLR/AC 43. The ANSI-41 HLR/AC verifies the MSID profile and returns an Authentication Request Return Result (authreq) message 173 to the ANSI-41 S-MSC. The ANSI-41 S-MSC sends a DTC Assignment message 174 to the M-ES on the DCCH. The ANSI-41 S-MSC also selects a TLDN and creates an Unsolicited Response (UNSOLRES) Invoke message 175 that includes the selected TLDN, and the MSID of the M-ES for which the unsolicited page response was received.

The ANSI-41 S-MSC sends the UNSOLRES message to the list of MSCs it has been configured to contact in the case of receiving an unsolicited page response. Upon receiving the UNSOLRES message, the ANSI-41 G-MSC 42*b* uses the indicated MSID to identify the outstanding ANSI-41 transaction. The ANSI-41 G-MSC treats the UNSOLRES message as the response to the Page message it sent out previously for the indicated MSID. Note that this message can be sent in conjunction with the AUTHREQ message. The ANSI-41 G-MSC then returns an Unsolicited Response Return Result (unsolres) message 176 to the ANSI-41 S-MSC 55.

Having identified the outstanding ANSI-41 transaction, the ANSI-41 G-MSC 42 continues its response to the received UNSOLRES message by sending a Routing Request Return Result (routreq) message 177 to the ANSI-41 VLR 42*a* and includes the TLDN. The ANSI-41 VLR sends a routreq message 178 to the ANSI-41 HLR/AC 43 and includes the TLDN. The ANSI-41 HLR/AC, in turn, sends a Location Request Return Result (locreq) message 179 to the ANSI-41 O-MSC 54 and includes the TLDN. The ANSI-41 O-MSC then makes a call at 181 to the ANSI-41 S-MSC 55 over the PSTN network using the TLDN. Upon receiving the call to the selected TLDN, the ANSI-41 S-MSC sends an Alert message 182 to the M-ES 51 on the DCCH.

The M-ES answers the call, and at 183 a speech path is established back to the ANSI-41 O-MSC 54. The ANSI-41 S-MSC 55 treats the unsolicited Page Response as the equivalent of a registration and sends a REGNOT Invoke message 184 to the ANSI-41 HLR/AC 43. The ANSI-41 HLR/AC sends a REGCANC message 185 to the ANSI-41 G-MSC 42*b* which deletes the associated ANSI-41 MSID record. The ANSI-41 G-MSC sends a MSID Gone message 186 to the GPRS-VLR IWF 37 to delete the associated MSID record.

The GPRS-VLR IWF 37 sends a Suspend message 187 to the SGSN 32 which marks the associated IMSI as being unavailable for packet data service. The SGSN then acknowledges receipt of the Suspend message by sending a Suspend Ack 188 to the GPRS-VLR IWF. The GPRS-VLR IWF responds by sending a MSID Gone Acknowledgment 189 to the ANSI-41 G-MSC 42*b*. The ANSI-41 G-MSC then confirms reception of the REGCANC message 185 by returning a Registration Cancellation Return Result (regcanc) message 191 to the ANSI-41 HLR/AC 43. The ANSI-41 HLR/AC then responds to the REGNOT message 184 by returning a Registration Notification Return Result (regnot) message 192 back to the ANSI-41 S-MSC 55.

Figure 11:
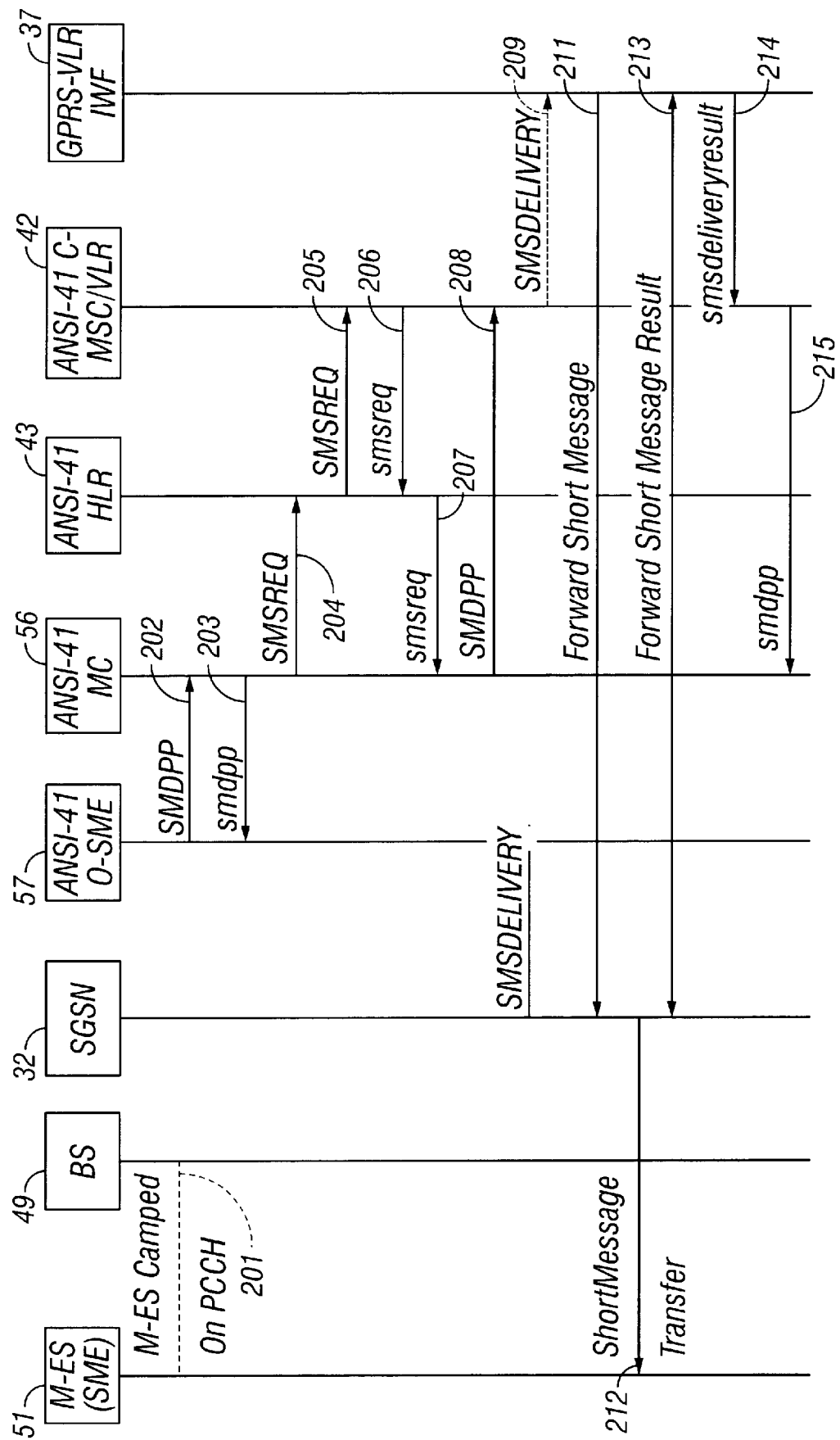
FIG. 11 is a message flow diagram illustrating the flow of signaling messages between the nodes of the integrated network of FIG. 5 when an incoming Short Message Service (SMS) message is received for a Class-D M-ES in the STANDBY state.

FIG. 11 is a message flow diagram illustrating the flow of signaling messages between the nodes of the integrated network of FIG. 5 when an incoming Short Message Service (SMS) message is received for a Class-D M-ES in the STANDBY state. Note: Communications between the ANSI-41 G-MSC 42 and the GPRS-VLR IWF 37 are shown using dotted lines to indicate that the message are not required to follow the ANSI-41 nor the GSM MAP formats. The names are italicized and generic, not following any existing standard message names.

At 201, a Class-D M-ES is camped on a PCCH served by the SGSN 32. It has already performed a successful GPRS Attach procedure, and has therefore received a TLLI assignment. An ANSI-41 Message Center (MC) 56 receives and accepts a Short Message Delivery Point-to-Point (SMDPP) message 202, requesting delivery of an SMS message to an M-ES-based SME, the destination SME 51. The source of the SMS message is the ANSI-41 originator SME (O-SME) 57. The ANSI-41 MC responds with a SMDPP Return Result (smdpp) message 203 since positive acknowledgment is required to the ANSI-41 O-SME. If the ANSI-41 MC does not have a current temporary SMS routing address and status for the addressed M-ES-based SME, it sends an SMS Request (SMSREQ) message 204 to the ANSI-41 HLR 43 associated with the M-ES-based SME. However, if the ANSI-41 MC does have a current temporary SMS routing address and status for the addressed MES-based SME, the process skips to step 208.

For the case where the destination SME is an M-ES camped on a PCCH, and for the case where only the G-MSC/VLR identity is required, the process skips to step 207. For the case where the destination SME is camped on PCCH, and where the current temporary SMS routing address and status are required, the following conditions apply:

(1) If the ANSI-41 HLR does not have a current temporary SMS routing address and status for the addressed M-ES-based SME, it forwards the SMSREQ message at 205 to the ANSI-41 G-MSC/VLR 42 associated with the M-ES-based SME. The ANSI-41 G-MSC/VLRresponds at 206;

(2) If the ANSI-41 HLR does have a current temporary SMS routing address and status for the addressed M-ES-based SME the process skips to step 207 where the ANSI-41 HLR sends a smsreq response message to the ANSI-41 MC 56.

The ANSI-41 G-MSC/VLR 42 responds by sending a smsreq message 206 containing the temporary SMS routing address for the served M-ES-based SME to the ANSI-41 HLR 43. The ANSI-41 HLR forwards the smsreq message containing the temporary SMS routing address for the served M-ES-based SME to the ANSI-41 MC 56. The ANSI-41 MC sends a SMDPP message 208 toward the destination SME using the temporary SMS routing address for the M-ES-based SME. The SMDPP is received by the ANSI-41 G-MSC/VLR 42 associated with the destination M-ES-based SME. The SMDPP is stripped of all header information, and only the SMS payload is retained. The ANSI-41 GMSC/VLR then sends a proprietary message (smsdelivery) 209 to the GPRS-VLR IWF 37, containing the SMS payload and the M-ES's address. The GPRS-VLR IWF sends a Forward Short Message 211 containing the SMS payload to the SGSN 32 serving the M-ES 51.

In order for the SMS payload, originating from the ANSI-41 network, to be understood by the destination GPRS network, ANSI-41 character sets, and other SMS payload integrity must be understood by the GPRS network which previously understood GSM character sets. In the present invention, the character sets are preferably as defined by the ANSI-41/IS-136 standards, and the Class-D M-ESs display these character sets. The GPRS nodes simply transit the SMS_BearerData (SM payload) between the ANSI-41 network and the M-ES-based SME. Payload frame size between the GPRS and the ANSI-41 short messages must also be aligned. Currently, the SMS_BearerData is theoretically limited to maximum 212 octets in length. In addition, the SMS Teleservice overhead is 10 octets. Furthermore, the ANSI SS7 overhead is 50 octets. Overall, the absolute maximum limit of the entire SS7 TCAP message is 272 octets, due to the SS7 constraint. (In reality, the SMS_BearerData may range between 129–175 octets uplink, and 117–175 octets downlink). The GPRS' Short Message payload may be larger than 212 octets, therefore, a shorter limit may have to be placed on GPRS short message lengths.

In addition, the SMS teleservice identifier may require mapping/translation. The teleservice identifier is one example of a SMDPP parameter which is required to be mapped to the IS-136 R-DATA message. Such parameters also require mapping between the ANSI-41 and the GPRS networks.

At 212, the SGSN 32 transfers the short message to the M-ES 51 on the LLC layers. The SGSN then returns a Forward Short Message Result message 213 to the GPRS-VLR IWF 37 indicating successful delivery of the SM. The GPRS-VLR IWF sends a smsdeliveryresult message 214 to the ANSI-41 G-MSCNLR 42, indicating successful delivery of the SMS payload to the destination M-ES. The ANSI-41 G-MSC/VLR returns a smdpp positive acknowledgment 215 to the ANSI-41 MC 56 which is the source of the corresponding SMDPP.

An incoming SMS message with the M-ES in the READY state is handled in the same manner as shown in FIG. 11.

Figure 12:
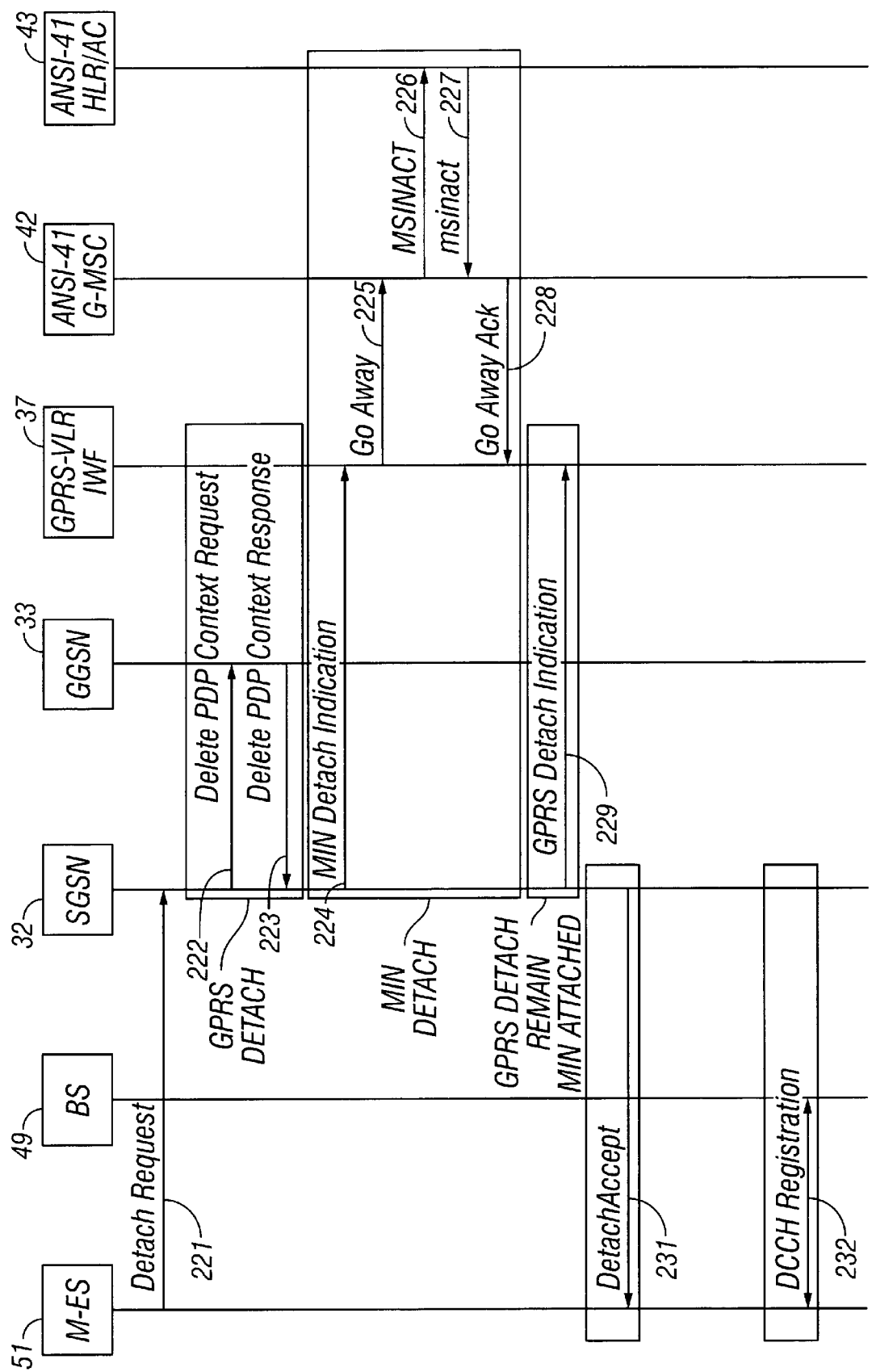
FIG. 12 is a message flow diagram illustrating the flow of signaling messages between the nodes of the integrated network of FIG. 5 when a M-ES initiates a Detach procedure.

FIG. 12 is a message flow diagram illustrating the flow of signaling messages between the nodes of the integrated network of FIG. when a M-ES in the READY state initiates a Detach procedure. The Detach function allows a Class-D M-ES to inform the network that a GPRS and/or MIN Detach is desired, and it allows the SGSN to inform an M-ES that it has been GPRS-detached by the network. The different types of Detach are MIN Detach (M-ES-initiated only), GPRS Detach, and combined MIN/GPRS Detach (M-ES-initiated only). If the M-ES wants to make a GPRS Detach, but wants to remain MIN Attached, it can perform a GPRS Detach, or it can perform a combined GPRS/MIN Detach and then go back to the DCCH and make a DCCH Registration as specified in ANSI-41 in order to Attach to the ANSI-41 S-MSC.

The M-ES may be detached from GPRS either explicitly or implicitly. In an explicit Detach: The SGSN or the M-ES explicitly requests Detach. In an implicit Detach, a logical link exists, and either the STANDBY timer expires indicating lack of activity, or an irrevocable radio error causes disconnection of the logical link. In the explicit Detach, a Detach Request (with TLLI and Cause) is sent by the SGSN to the M-ES, or by the M-ES to the SGSN. The M-ES can make a MIN Detach in one of two ways depending on whether it is GPRS-attached or not. First, a GPRS-attached M-ES sends a Detach Request message to the SGSN, indicating a MIN Detach. This can be made in combination with a GPRS Detach. The Detach Request message indicates whether or not the detach is due to switch off. This information is needed to determine whether or not a Detach Accept message should be returned. In the SGSN-originated Detach Request message there may be an indication to tell the M-ES that it is requested to initiate GPRS Attach and PDP Context Activation procedures for the previously activated PDP contexts. Second, an M-ES not attached to the GPRS makes a MIN Detach as already defined in ANSI-41.

Referring now to FIG. 12, a Detach procedure initiated by the M-ES 51 is illustrated. At 221, the M-ES detaches by sending a Detach Request (with TLLI, Detach Type, and Switch Off) to the SGSN 32. Detach Type indicates which type of Detach is to be performed (i.e., GPRS Detach only, MIN Detach only, or combined GPRS/MIN Detach). Switch Off indicates whether or not the Detach is due to a switch off situation. If the Detach type is a GPRS detach, the SGSN sends a Delete PDP Context Request 222 (with TID) to the GGSN 33 in order to deactivate the active PDP contexts in the GGSN associated with this particular M-ES. The GGSN acknowledges with a Delete PDP Context Response 223 (with TID).

If the Detach type is a MIN Detach, the SGSN 32 sends a MIN Detach Indication 224 (with IMSI) to the GPRS-VLR IWF 37. The GPRS-VLR IWF translates IMSI to MIN and sends a Go Away Message 225 to the ANSI-41 G-MSC 42. The ANSI-41 G-MSC sends a MS Inactive (MSINACT) message 226 to the ANSI-41 HLR/AC 43, which then marks the M-ES unavailable for service. The ANSI-41 HLR/AC sends a MS Inactive Return Result (msinact) message 227 back to the ANSI-41 G-MSC. The ANSI-41 G-MSC sends a Go Away Acknowledgment message 228 to the GPRS-VLR IWF.

If the M-ES 51 wants to remain MIN-attached and is doing a GPRS Detach, the SGSN 32 sends a GPRS Detach Indication message 229 (with IMSI) to the GPRS-VLR IWF 37. The GPRS-VLR IWF removes the association with the SGSN. The M-ES then goes back to the DCCH and makes a DCCH Registration as specified in ANSI-41 in order to attach to the ANSI-41 S-MSC. If Switch Off indicates that the Detach is not due to a switch off situation, the SGSN 32 sends a Detach Accept message 231 (with TLLI) to the M-ES 51. If the M-ES is remaining MIN-attached and is doing a GPRS Detach, the M-ES goes back to the DCCH and makes a DCCH Registration 232 as specified in ANSI-41 in order to Attach to the ANSI-41 S-MSC.

The MIN Detach procedure is mutually exclusive of the procedure for GPRS Detach/Remain MIN Attached. Therefore, the following sequences of the steps shown in FIG. 12 may be performed for the different Detach types. For a MIN Detach, steps 221, 224–228, and 231 are performed. For a GPRS Detach, steps 221–223 and 229–232 are performed. For a Combined MIN/GPRS Detach (power down), steps 221–228 are performed.

Table 5 below provides additional information for the Gx interface.

TABLE 5

| Message/Info. Element | Meaning | Comment |
| --- | --- | --- |
| Go Away | A Detach Message | Sent from the GPRS-VLR IWF to the ANSI-41 G-MSC to indicate a MIN Detach for the M-ES |
| Go Away Ack | | |

When the Detach procedure is initiated by the SGSN 32, the procedure is the same as shown in Section 6.1.6.2 of GSM 03.60.

Figure 13:
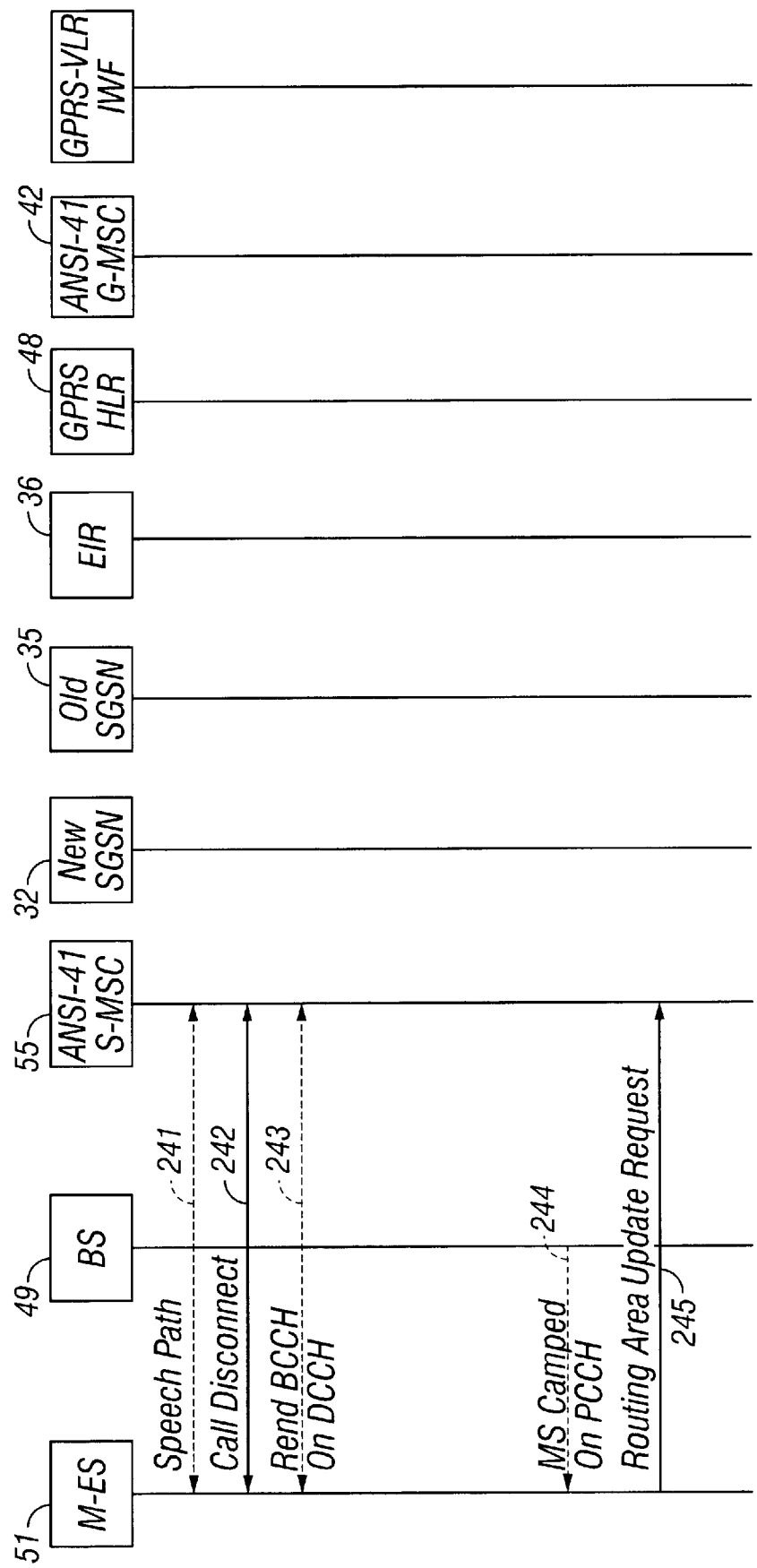
FIG. 13 is a message flow diagram illustrating the flow of signaling messages when a Class-D M-ES in the CONVERSATION state initiates a call disconnect while on a Digital Traffic Channel.

FIG. 13 is a message flow diagram illustrating the flow of signaling messages when a Class-D M-ES in the CONVERSATION state initiates a call disconnect while on a Digital Traffic Channel. A Class-D M-ES in the CONVERSATION state which initiates a call disconnect while on a DTC, tunes to a PCCH, performs a location update procedure, and then enters the STANDBY state.

At 241, a Class-D M-ES 51 is in CONVERSATION state on a DTC. The SGSN 32 has received a Suspend message (not shown) as a result of the M-ES being served by the ANSI-41 infrastructure. Therefore, the M-ES is not receiving any packet data transactions. At 242, either the M-ES or the ANSI-41 S-MSC 55 disconnects the call. The M-ES finds a DCCH at 243 and reads BCCH information thereon. If the M-ES desires packet data service, and packet data service is supported using a modulation scheme the M-ES is capable of, the M-ES reads Beacon PCCH information to determine where packet data service is available. The M-ES then tunes to the Beacon PCCH at 244 and reads P-BCCH information thereon. If the M-ES is not on its assigned PCCH, it tunes to its assigned PCCH and reads P-BCCH thereon. At 245, the M-ES sends a Routing Area Update Request to begin a location update procedure as previously described (i.e., either an Intra-SGSN Routing Update or Inter-SGSN Routing Update may result). Following the completion of the location update procedure, the M-ES is once again available for both packet data service and circuit-switched service.

It is thus believed that the operation and construction of the present invention will be apparent from the foregoing description. While the system and method shown and described has been characterized as being preferred, it will be readily apparent that various changes and modifications could be made therein without departing from the scope of the invention as defined in the following claims.

What is claimed is:

1. An integrated radio telecommunications network which integrates an ANSI-41 circuit switched network and a General Packet Radio Service (GPRS) packet data network, said integrated radio telecommunications network comprising:
   a mobile switching center (MSC) in the ANSI-41 network that provides circuit switched services to a mobile station which operates in both the ANSI-41 network and the GPRS network;
   a serving GPRS switching node (SGSN) in the GPRS network that provides packet switched services to the mobile station;
   an interworking function that interfaces the MSC with the SGSN, said interworking function mapping circuit switched signaling utilized by the MSC into GPRS packet switched signaling utilized by the SGSN, and mapping GPRS packet switched signaling into circuit switched signaling;
   an interworking GPRS base station controller that interfaces the SGSN with a GPRS/ANSI-136 base station which supports both ANSI-136 operations and GPRS operations, said interworking GPRS base station controller adapting a signaling format utilized by the SGSN into an air interface signaling format, and passing traffic signaling between the SGSN and the GPRS/ANSI-136 base station; and
   means for tunneling ANSI-136 information between the mobile station and the ANSI-41 network by adding the ANSI-136 information to selected GPRS messages.

2. The integrated radio telecommunications network of claim 1 wherein the ANSI-136 information which is added to the selected GPRS messages includes registration and authentication information.

3. The integrated radio telecommunications network of claim 2 wherein the registration and authentication information includes a Mobile Identification Number (MIN), an Electronic Serial Number (ESN), and an ANSI-41 Authentication Response (AUTHR).

4. The integrated radio telecommunications network of claim 1 wherein the selected GPRS messages to which ANSI-136 information is added include an Attach Request message which is sent from the mobile station to the SGSN during a GPRS Attach procedure, and a Location Updating Request which is sent from the SGSN to the interworking function that interfaces the MSC with the SGSN.

5. An integrated radio telecommunications network which integrates an ANSI-41 circuit switched network and a General Packet Radio Service (GPRS) packet data network, said integrated radio telecommunications network comprising:
   a Class D mobile station which operates only over 30 kHz channels in both the ANSI-41 network and the GPRS network;
   a mobile switching center (MSC) in the ANSI-41 network that provides circuit switched services to the mobile station;
   a serving GPRS switching node (SGSN) in the GPRS network that provides packet switched services to the mobile station;
   an interworking function that interfaces the MSC with the SGSN, said interworking function mapping circuit switched signaling utilized by the MSC into GPRS packet switched signaling utilized by the SGSN, and mapping GPRS packet switched signaling into circuit switched signaling; and
   an interworking GPRS base station controller that interfaces the SGSN with a GPRS/ANSI-136 base station which supports both ANSI-136 operations and GPRS operations, said interworking GPRS base station controller adapting a signaling format utilized by the SGSN into an air interface signaling format, and passing traffic signaling between the SGSN and the GPRS/ANSI-136 base station.

6. The integrated radio telecommunications network of claim 5 wherein the Class D mobile station camps on a packet control channel (PCCH) as its normal mode of operation and only changes to a digital control channel (DCCH) at power-up, at voice call establishment, and at GPRS Detach.

7. The integrated radio telecommunications network of claim 5 wherein the Class D mobile station is equipped with an International Mobile Station Identification (IMSI) which is utilized in the GPRS network.

8. The integrated radio telecommunications network of claim 7 wherein the interworking function includes means for translating the Class D mobile station's Mobile Identification Number (MIN) utilized in the ANSI-41 network into an associated IMSI utilized in the GPRS network.

9. The integrated radio telecommunications network of claim 8 further comprising:
   a GPRS Home Location Register (GPRS HLR) in the GPRS network which authenticates the Class D mobile station for packet data purposes; and
   an ANSI-41 home location register/authentication center (HLR/AC) in the ANSI-41 network which authenticates the Class D mobile station for circuit switched purposes.

10. The integrated radio telecommunications network of claim 9 further comprising a Class E mobile station which operates only over 30-kHz channels, and only in the GPRS network, said Class E mobile station camping on a packet control channel (PCCH) as its normal mode of operation and only changing to a digital control channel (DCCH) at power-up to verify packet data service availability.

11. The integrated radio telecommunications network of claim 10 wherein the Class E mobile station is equipped with an IMSI, and the GPRS HLR includes means for authenticating the Class E mobile station.

12. The integrated radio telecommunications network of claim 5 further comprising means for operating the Class D mobile station over one or more Enhanced-Data-Rates-for-GSM-Evolution (EDGE) channels for a packet data service.

13. The integrated radio telecommunications network of claim 5 further comprising means for transitioning the operation of Class D mobile station from over the 30 kHz channels to over one or more Enhanced-Data-Rates-for-GSM-Evolution (EDGE) channels.

14. The integrated radio telecommunications network of claim 13 further comprising means for transitioning the operation of Class D mobile station from over the Enhanced-Data-Rates-for-GSM-Evolution (EDGE) channels to over the 30 kHz channels.

* * * * *